(12) United States Patent
Kimura

(10) Patent No.: US 11,029,579 B2
(45) Date of Patent: Jun. 8, 2021

(54) IMAGING APPARATUS AND ELECTRONIC APPARATUS FOR CONTROLLING A POSITION OF A LENS

(71) Applicant: SONY SEMICONDUCTOR SOLUTIONS CORPORATION, Kanagawa (JP)

(72) Inventor: Katsuji Kimura, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/607,034

(22) PCT Filed: Apr. 13, 2018

(86) PCT No.: PCT/JP2018/015472
§ 371 (c)(1),
(2) Date: Oct. 21, 2019

(87) PCT Pub. No.: WO2018/198815
PCT Pub. Date: Nov. 1, 2018

(65) Prior Publication Data
US 2020/0387049 A1    Dec. 10, 2020

(30) Foreign Application Priority Data

Apr. 28, 2017  (JP) .............................. JP2017-089600

(51) Int. Cl.
*G03B 13/36* (2021.01)
*H02K 11/225* (2016.01)
(Continued)

(52) U.S. Cl.
CPC ............ *G03B 13/36* (2013.01); *G02B 5/208* (2013.01); *G02B 7/09* (2013.01); *G03B 11/00* (2013.01);
(Continued)

(58) Field of Classification Search
CPC .................. G03B 13/36; G03B 11/00; G03B 2205/0069; H02K 41/0356; H02K 11/225;
(Continued)

(56) References Cited

U.S. PATENT DOCUMENTS 5,873,004 A       2/1999  Shiomi
2010/0322612 A1  12/2010  Tsuda et al.
(Continued)

FOREIGN PATENT DOCUMENTS

JP    H05-0616371    3/1993
JP    2000-295832   10/2000
(Continued)

OTHER PUBLICATIONS

International Search Report prepared by the Japan Patent Office dated Jun. 26, 2018, for International Application No. PCT/JP2018/015472.

*Primary Examiner* — Padma Haliyur
(74) *Attorney, Agent, or Firm* — Sheridan Ross P.C.

(57) ABSTRACT

The present technology relates to an imaging apparatus and an electronic apparatus that are capable of adjusting a focal position with high accuracy. There are provided a lens that collects subject light, an image sensor that photoelectrically converts the subject light from the lens, a circuit substrate including a circuit that outputs a signal from the image sensor to the outside, an actuator that drives the lens with a pulse width modulation (PWM) waveform, and a detection unit that detects a magnetic field generated by a coil included in the actuator. The detection unit detects an induced electromotive force generated by the magnetic field. In addition, the detection unit detects a position of the lens from the induced electromotive force. The present technology can be applied to an imaging apparatus.

18 Claims, 19 Drawing Sheets

A

B

(51) Int. Cl.
  *G02B 5/20*    (2006.01)
  *G02B 7/09*    (2021.01)
  *G03B 11/00*   (2021.01)
  *H02K 41/035*  (2006.01)
  *H04N 5/225*   (2006.01)

(52) U.S. Cl.
  CPC ....... *H02K 11/225* (2016.01); *H02K 41/0356* (2013.01); *H04N 5/2252* (2013.01); *H04N 5/2253* (2013.01); *G03B 2205/0069* (2013.01)

(58) Field of Classification Search
  CPC ........ G02B 7/09; G02B 5/208; H04N 5/2252; H04N 5/2253

See application file for complete search history.

(56) References Cited

U.S. PATENT DOCUMENTS

| 2015/0116581 | A1* | 4/2015 | Liu | G03B 13/36 |
| | | | | 348/357 |
| 2015/0207983 | A1 | 7/2015 | Kang et al. | |
| 2016/0178923 | A1* | 6/2016 | Hayashi | H04N 5/2328 |
| | | | | 359/557 |
| 2016/0295099 | A1* | 10/2016 | Kasamatsu | H02P 25/06 |
| 2018/0149881 | A1* | 5/2018 | Kim | G02B 7/09 |

FOREIGN PATENT DOCUMENTS

| JP | 2007-312012 | 11/2007 |
| JP | 2008-116594 | 5/2008 |
| JP | 2011-022563 | 2/2011 |
| JP | 2011-097158 | 5/2011 |
| JP | 2014-082682 | 5/2014 |
| JP | 2016-537665 | 12/2016 |
| WO | WO 2016/132883 | 8/2016 |

* cited by examiner

IMAGING APPARATUS AND ELECTRONIC APPARATUS FOR CONTROLLING A POSITION OF A LENS

CROSS REFERENCE TO RELATED APPLICATIONS

This application is a national stage application under 35 U.S.C. 371 and claims the benefit of PCT Application No. PCT/JP2018/015472 having an international filing date of 13 Apr. 2018, which designated the United States, which PCT application claimed the benefit of Japanese Patent Application No. 2017-089600 filed 28 Apr. 2017, the entire disclosures of each of which are incorporated herein by reference.

TECHNICAL FIELD

The present technology relates to an imaging apparatus and an electronic apparatus, for example, to an imaging apparatus and an electronic apparatus capable of controlling a position of a lens with high accuracy.

BACKGROUND ART

In recent years, pixel-density increase, performance enhancement, size reduction, and the like of an imaging apparatus have been advanced, for example. With the pixel-density increase and the performance enhancement of the imaging apparatus, power consumption of an image sensor such as a charge-coupled device (CCD) sensor or a complementary metal-oxide-semiconductor (CMOS) image sensor mounted on the imaging apparatus has been increased.

In addition, power consumption of the imaging apparatus also tends to increase because power consumption of an actuator or the like for driving a lens focus has also been increased.

In order to reduce the power consumption, a method has been proposed in which the power consumption is reduced to about half by transforming a drive signal of the actuator into a pulse width modulation (PWM) waveform. However, it is known that when the actuator is PWM driven, a magnetic field is generated and becomes a disturbance factor of an image sensor, and noise is mixed into the image sensor.

In order to reduce the noise, it is proposed to synchronize a drive waveform of an image sensor with an auto-focus driver that generates a PWM signal, and output a PWM waveform in a dead zone area during a drive time of the image sensor.

In addition, as one method for the performance enhancement of the imaging apparatus, it is also proposed to mount a Hall element on the actuator and output a position of a lens to the outside to always detect a focal position of the lens and move the lens to a position where subject light is collected quickly.

For example, in Patent Document 1, it is proposed that a drive element (actuator) is controlled with a PWM signal from a focus drive circuit and a lens is driven to change a focus of a lens and achieve auto-focus. In Patent Document 1, it is also proposed that a Hall element is mounted for high-performance detection of a position of a lens.

In Patent Document 2, it is proposed that noise of an image sensor caused by a magnetic field generated by PWM driving of an actuator is reduced by providing a metal plate to block (shield) the magnetic field.

In Patent Document 3, it is proposed that a position of a lens is detected by using a PWM signal (alternating current signal) on the basis of an electromotive force of a detection coil disposed opposite to an excitation power. In this proposal, the detection coil is installed on a side of an operating lens, and it is proposed that the position is detected from a phase of an electromotive current in parallel movement of an excitation coil and the detection coil.

CITATION LIST

Patent Document

Patent Document 1: JP 2011-022563 A
Patent Document 2: JP 2014-082682 A
Patent Document 3: JP 2000-295832 A

SUMMARY OF THE INVENTION

Problems to be Solved by the Invention

According to Patent Document 1, it is difficult to reduce a size of an imaging apparatus because it is necessary to mount a Hall element and thus a size of an actuator increases. In addition, there is a concern that the imaging apparatus becomes expensive because it is necessary to mount a Hall element.

According to Cited Document 2, there is a concern that an imaging apparatus becomes expensive because gold, silver, copper, aluminum, or the like is used for a metal plate for blocking a magnetic field. In addition, provision of the metal plate for blocking a magnetic field does not contribute to size reduction of the imaging apparatus.

A recent actuator has a structure in which a coil is disposed outside a lens, and a focus is detected by movement of the coil to a vertical side of an image sensor on the basis of an excitation power. When Cited Document 3 is applied to such a structure, a coil of an excitation power and a detection coil are disposed opposite to each other, and a position of a lens cannot be detected by parallel movement of these coils. That is, it is difficult to apply Cited Document 3 to a recent actuator.

The present technology has been made in view of such a situation, and makes it possible to provide an imaging apparatus which can be enhanced in performance, reduced in power consumption, and reduced in size.

Solutions to Problems

An imaging apparatus according to one aspect of the present technology includes: a lens that collects subject light; an image sensor that photoelectrically converts the subject light from the lens; a circuit substrate including a circuit that outputs a signal from the image sensor to the outside; an actuator that drives the lens with a pulse width modulation (PWM) waveform; and a detection unit that detects a magnetic field generated by a coil included in the actuator.

An electronic apparatus according to one aspect of the present technology includes an imaging apparatus including: a lens that collects subject light; an image sensor that photoelectrically converts the subject light from the lens; a circuit substrate including a circuit that outputs a signal from the image sensor to the outside; an actuator that drives the lens with a pulse width modulation (PWM) waveform; and a detection unit that detects a magnetic field generated by a coil included in the actuator.

The imaging apparatus according to one aspect of the present technology includes an image sensor that photoelectrically converts subject light from a lens that collects the subject light, a circuit substrate including a circuit that outputs a signal from the image sensor to the outside, and an actuator that drives the lens with a pulse width modulation (PWM) waveform. In the imaging apparatus, a magnetic field generated by a coil included in the actuator is detected.

Note that each of the imaging apparatus and the electronic apparatus may be an independent apparatus, or the imaging apparatus and the electronic apparatus may be internal blocks constituting one apparatus.

Effects of the Invention

According to one aspect of the present technology, it is possible to provide an imaging apparatus which can be enhanced in performance, reduced in power consumption, and reduced in size.

Note that effects described herein are not necessarily limited, and any of the effects described in the present disclosure may be obtained.

MODE FOR CARRYING OUT THE INVENTION

Hereinafter, a mode for carrying out the present technology (hereinafter referred to as an embodiment) will be described.

<Configuration of Imaging Apparatus>

The present technology can be applied to an imaging apparatus including an image sensor such as a charge-coupled device (CCD) sensor or a complementary metal-oxide-semiconductor (CMOS) image sensor. In addition, the present technology can also be applied to an apparatus including such an imaging apparatus, for example, a portable terminal apparatus.

Figure 1:
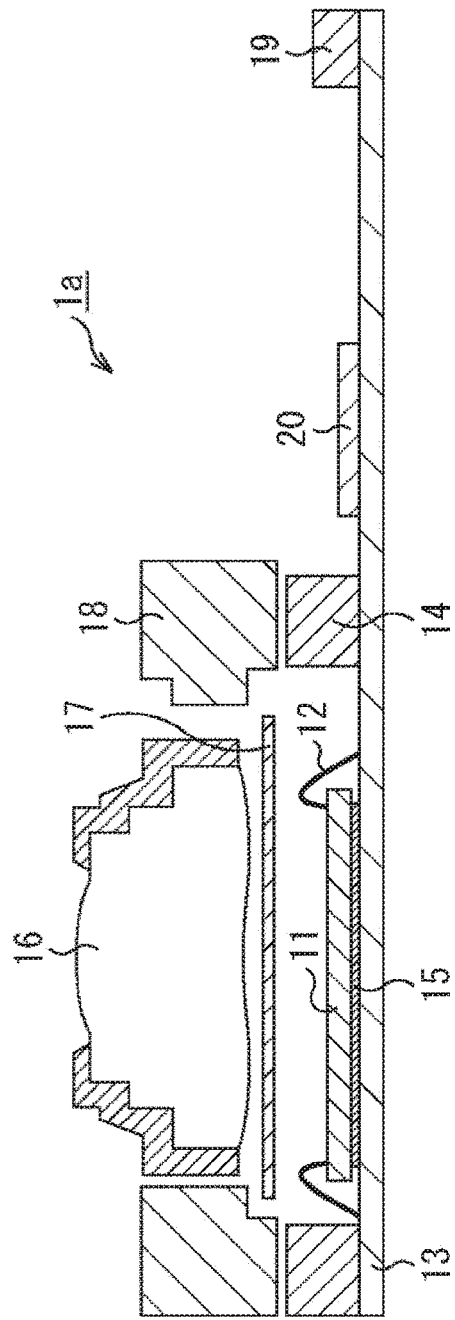
FIG. 1 is a diagram illustrating a configuration of an embodiment of an imaging apparatus to which the present technology is applied.

FIG. 1 is a diagram illustrating a configuration of an embodiment of an imaging apparatus according to one aspect of the present technology. An imaging apparatus 1 illustrated in FIG. 1 includes an image sensor 11 such as a CCD sensor or a CMOS image sensor that captures an image by photoelectrically converting subject light from a subject.

In addition, the imaging apparatus 1 includes a lens 16 that collects subject light, and an infrared cut filter 17 for blocking infrared light from an optical signal transmitted through the lens 16. In addition, the imaging apparatus 1 also includes an actuator 18 that drives the lens vertically in a direction of the image sensor 11 to focus the lens 16.

In addition, the imaging apparatus 1 includes an auto-focus driver 20 for controlling the actuator 18 from the outside, and also includes a circuit board 13 for outputting an electrical signal of the image sensor 11 to the outside. Note that, although the circuit board 13 is described here, a circuit substrate may be used instead of a plate-like board.

In addition, the imaging apparatus 1 includes a metal wire 12 for electrically connecting the image sensor 11 and the circuit board 13, includes an adhesive material 15 for fixing the image sensor 11 and the circuit board 13, and also includes a spacer 14 for fixing the actuator 18 and the circuit board 13 described above.

In order to reduce power consumed by the imaging apparatus 1, the auto-focus driver 20 described above has a function of outputting a pulse width modulation (PWM) waveform to the actuator 18. The actuator 18 has a function of driving a focus of the lens 16 with an input PWM waveform.

The circuit board 13 has a function of detecting an induced electromotive force generated by a magnetic field generated from a PWM waveform, and has a function of detecting a position of the lens 16 from the detected induced electromotive force. In addition, the circuit board 13 also has a function of achieving high-performance focus movement of the lens by outputting a detected result to the outside.

<Regarding Detection of Induced Electromotive Force>

Figure 2:
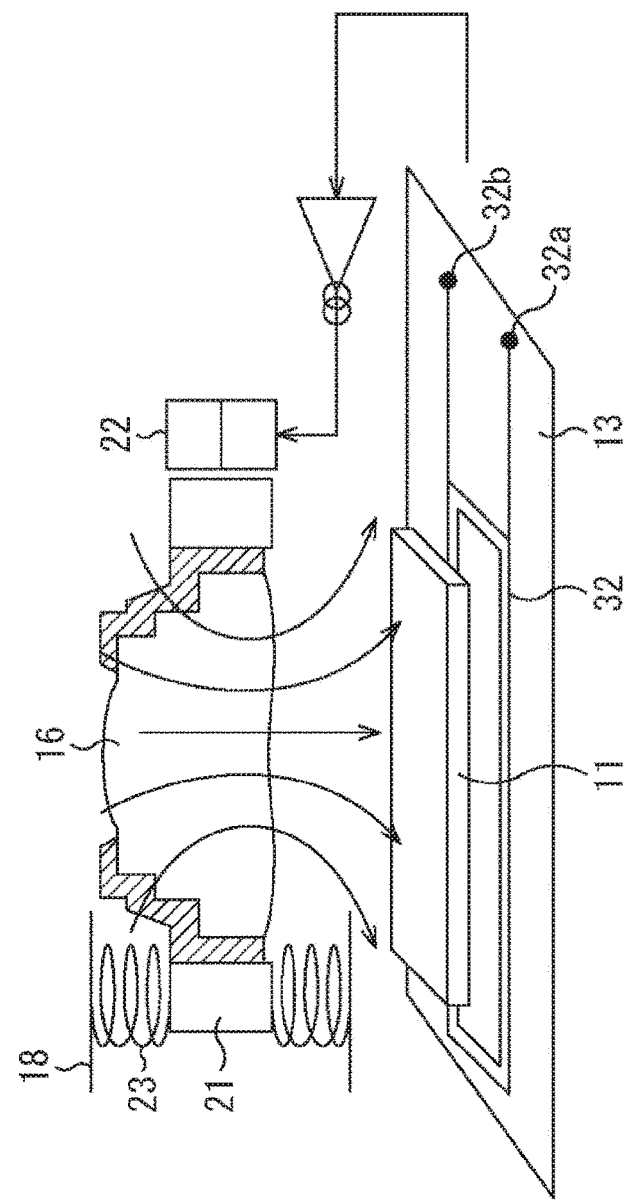
FIG. 2 is a diagram for describing a magnetic field to be generated.

FIG. 2 is a diagram for describing a magnetic field generated by a PWM waveform and an induced electromotive force generated by the magnetic field.

The actuator 18 has a voice coil motor structure, and a coil 21 is supported by a spring 23. For example, the coil 21 is provided on a side surface of a lens carrier, and a magnet 22 is provided on an opposite side of the coil 21.

When a current flows through the coil 21, a force is generated in a vertical direction in the drawing. By the generated force, the lens 16 held by a lens barrel is moved upward or downward, and a distance from the image sensor 11 is changed. By such a mechanism, auto-focus (AF) is achieved.

Incidentally, compared to a case where a current flowing through the coil 21 is a signal having a constant voltage value (a signal that always maintains a Hi state), a case where a current flowing through the coil 21 is a PWM waveform drive signal (a signal in which Hi and Low are switched at a predetermined cycle) consumes less power than a signal in which a Hi state continues.

Therefore, in order to reduce power consumption, in a case where a signal supplied to the coil 21 is a PWM waveform drive signal, a magnetic field is generated in a direction illustrated in FIG. 2. Referring to FIG. 2, the magnetic field is generated from a side of the lens 16 in a direction toward the image sensor 11.

Note that, although a magnetic field is generated in a direction different from the direction illustrated in FIG. 2 depending on a direction of a current, the description will be continued here by taking a case where a magnetic field is generated in the direction illustrated in FIG. 2 as an example.

The generated magnetic field transmits through the image sensor 11. Therefore, an image captured by the image sensor 11 may be affected. For example, under influence of the magnetic field, noise may be generated, and an image (image signal) in which the noise is mixed may be output from the image sensor 11.

By synchronizing a PWM waveform drive signal with a drive signal of the image sensor 11 so as not to generate a magnetic field in a drive period to be noise of the image sensor 11, influence of the noise from the magnetic field can be reduced. By such synchronization, an image that is not affected by the magnetic field can be output from the imaging apparatus 1.

The magnetic field generated by supplying a PWM waveform drive signal to the coil 21 also reaches the circuit board 13. A function of detecting a position of the lens 16 by detecting intensity of the magnetic field reaching the circuit board 13 will be described.

As illustrated in FIG. 2, the circuit board 13 is provided with a coil 32. By providing the coil 32 in a direction perpendicular to the magnetic field generated by PWM waveform drive, an induced electromotive force is generated in the coil 32, and a position of the lens 16 (lens holder) can be detected on the basis of magnitude of the induced electromotive force.

In addition, high-performance driving of a lens, that is, auto-focus, can be achieved by enabling detection of a position of the lens 16 (lens holder), in other words, detection of a distance between the lens 16 and the image sensor 11.

First, as illustrated in FIG. 2, an example is shown here in which an induced electromotive force is detected by mounting the coil 32 constituting a part of a detection circuit 31 on the circuit board 13.

Figure 3:
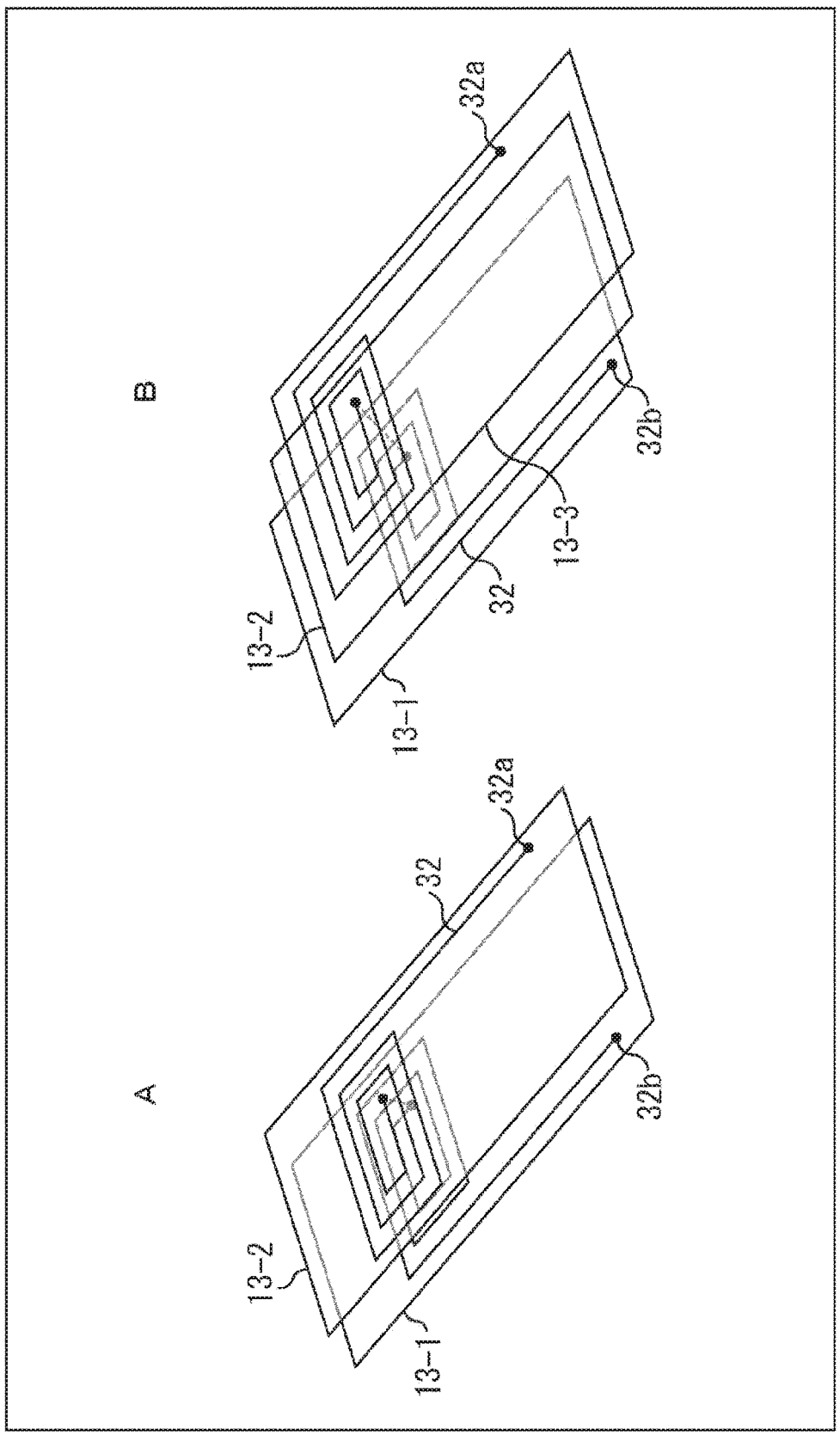
FIG. 3 is a diagram for describing a coil to be formed.

FIG. 3 is a diagram illustrating an example of mounting the coil 32 constituting a part of the detection circuit 31 on the circuit board 13.

The coil 32 has a start point 32*a* and an end point 32*b*, and the start point 32*a* and the end point 32*b* are connected to the detection circuit 31 not illustrated in FIG. 3. Because of a loop shape of the coil 32, and to avoid overlapping of wires, one of the start point 32*a* and the end point 32*b* is positioned inside the loop and the other is positioned outside the loop.

Thus, when considering that the start point 32*a* and the end point 32*b* are connected to the detection circuit 31, in other words, a wire is taken out from each of the start point 32*a* and the end point 32*b*, the coil 32 needs to be formed across a plurality of layers.

A of FIG. 3 is referred to. Assuming that the circuit board 13 includes one layer, for example, the start point 32*a* of the coil 32 is a point on a lower right side in the figure, and an end point is a center portion of the coil 32 (indicated by a black point in A of FIG. 3). In a case where a wire is taken out from the end point in the center portion of the coil 32, it is difficult to take out the wire so that there is no overlapping with the formed coil 32.

To address this, as illustrated in A of FIG. 3, the circuit board 13 includes two layers. The circuit board 13 illustrated in A of FIG. 3 includes two layers, that is, a circuit board 13-1 and a circuit board 13-2. On the circuit board 13-1, the start point 32*a* of the coil 32 is formed, and the coil is formed from the start point 32*a*, in a loop shape from the outside to the inside.

In addition, an end point of the coil 32 in a first layer is formed in a center portion of the coil 32 formed on the circuit board 13-1, and a start point of the coil 32 in a second layer is connected to the end point. On the circuit board 13-2 in the second layer, the coil 32 is formed from the start point, in a loop shape from the inside to the outside.

The coil 32 in a loop shape is formed from the start point 32*a* formed on the circuit board 13-1 to the end point 32*b* formed on the circuit board 13-2. In addition, by using the start point 32*a* formed on the circuit board 13-1 and the end point 32*b* formed on the circuit board 13-2, the coil 32 can be connected to the detection circuit 31 that is not illustrated.

Note that, although not illustrated in A of FIG. 3, for example, a circuit for outputting an electrical signal from the image sensor 11 to the outside is formed in a portion other than a portion where the coil 32 is formed.

Although the case where the circuit board 13 includes two layers has been illustrated as an example in the example illustrated in A of FIG. 3, the circuit board 13 may include three layers as illustrated in B of FIG. 3. In an example illustrated in B of FIG. 3, the circuit board 13 includes three layers, that is, the circuit boards 13-1 to 13-3, the coil 32 in a loop shape is formed on each circuit board 13, and the coils 32 on the respective layers are connected to form one coil.

In addition, in the case where the circuit board 13 includes three layers as illustrated in B of FIG. 3, for example, the coil 32 may be formed on the first-layer circuit board 13-1 and the third-layer circuit board 13-3, while the coil 32 may not be formed on the second-layer circuit board 13-2, and the circuit board 13-2 may be used exclusively for a circuit for outputting an electrical signal from the image sensor 11 to the outside.

In the case where the circuit board 13 is formed in this manner, a wiring for connecting the coil 32 formed on the circuit board 13-1 and the coil 32 formed on the circuit board 13-3 is formed on the circuit board 13-2.

Thus, the circuit board 13 can include a plurality of layers, and the coil 32 can be formed across the plurality of layers. In addition, the number of layers of the circuit board 13 and a layer configuration can be the number of layers and the layer configuration indicated herein, or can be another number of layers and another layer configuration.

The circuit board 13 is, for example, a board including a plurality of layers (layers) wired by a copper wire such as an FPC, and has a role of outputting an electrical signal of the image sensor 11 (FIG. 1) to the outside. A copper wire is further wired in a coil shape to such a circuit board 13 for detection of a magnetic field.

A magnetic field generated when a current flows through the coil 21 (FIG. 2) in the actuator 18 flows into such a coil 32. As a result, an induced electromotive force is generated in the coil 32. The generated induced electromotive force can be obtained by Federer's law.

When a magnetic flux passing through an N-turn coil changes by ΔΦ [Wb] during Δt [s], an induced electromotive force V [V] generated in the coil is expressed by the following formula (1).

$$V = -N \cdot \Delta\Phi/\Delta t \qquad (1)$$

From Formula (1), it can be seen that as the number of turns N increases, an induced electromotive force increases accordingly. As described above, the number of turns and the induced electromotive force can be increased by forming the coil 32 over a plurality of layers of the circuit board 13. Thus, the coil 32 can be configured to easily detect the induced electromotive force to be generated.

A configuration of the detection circuit 31 connected to such a coil 32 will be described. Note that, hereinafter, the description is continued as if the circuit board 13 is illustrated in the drawing as including one layer. However, as described above, the circuit board 13 includes a plurality of layers.

<Configuration of Detection Circuit>

Figure 4:
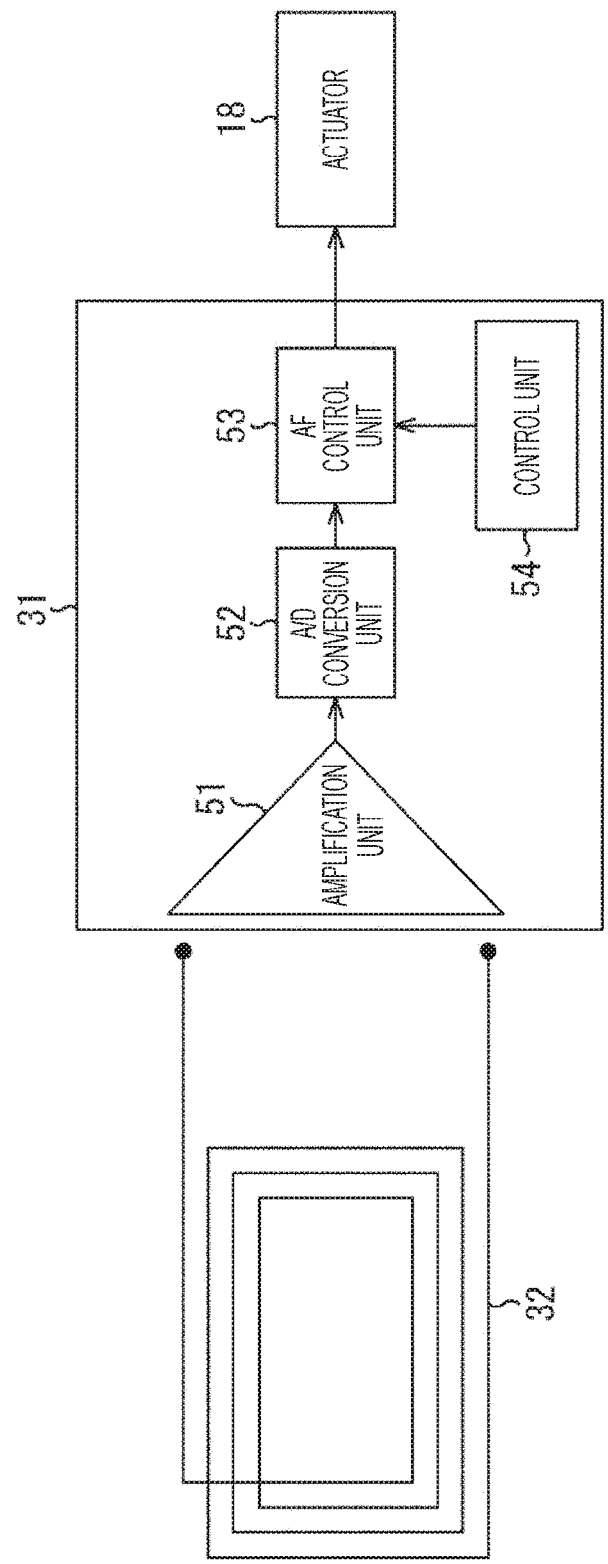
FIG. 4 is a diagram illustrating a configuration example of a detection circuit.

FIG. 4 is a diagram illustrating a configuration example of the detection circuit 31. An induced electromotive force generated by the coil 32 is input to an amplification unit 51 of the detection circuit 31 and amplified. The amplified induced electromotive force is input into an analog/digital (A/D) conversion unit 52, and converted from analog data to digital data.

An AF control unit 53 controls the actuator 18, and recognizes a focal length of the lens 16 (FIG. 1) with the digital data from the A/D conversion unit 52. In a case where correction of the focal length is necessary, that is, in a case of being determined to be out of focus, the AF control unit 53 generates a PWM control signal based on a movement distance necessary for the correction and supplies the PWM control signal to the actuator 18. Note that the AF control unit 53 also performs processing of generating a PWM control signal on the basis of a signal from a control unit 54 that controls auto-focus (AF), and supplying the PWM control signal to the actuator 18.

The detection circuit 31 may be mounted in the imaging apparatus 1 as one integrated circuit, or may be mounted outside the imaging apparatus 1. In addition, the detection circuit 31 may be implemented not as an integrated circuit but as software, or as software of an integrated CPU of a camera.

The present technology includes a function of detecting an induced electromotive force and a function of adjusting a focus of a lens with high accuracy by the induced electromotive force, and, as a matter of course, a case where these functions are implemented by an integrated circuit or software as described above is within the scope of the present invention. However, a case where these functions are implemented by other methods is also within the scope of the present invention.

Figure 5:
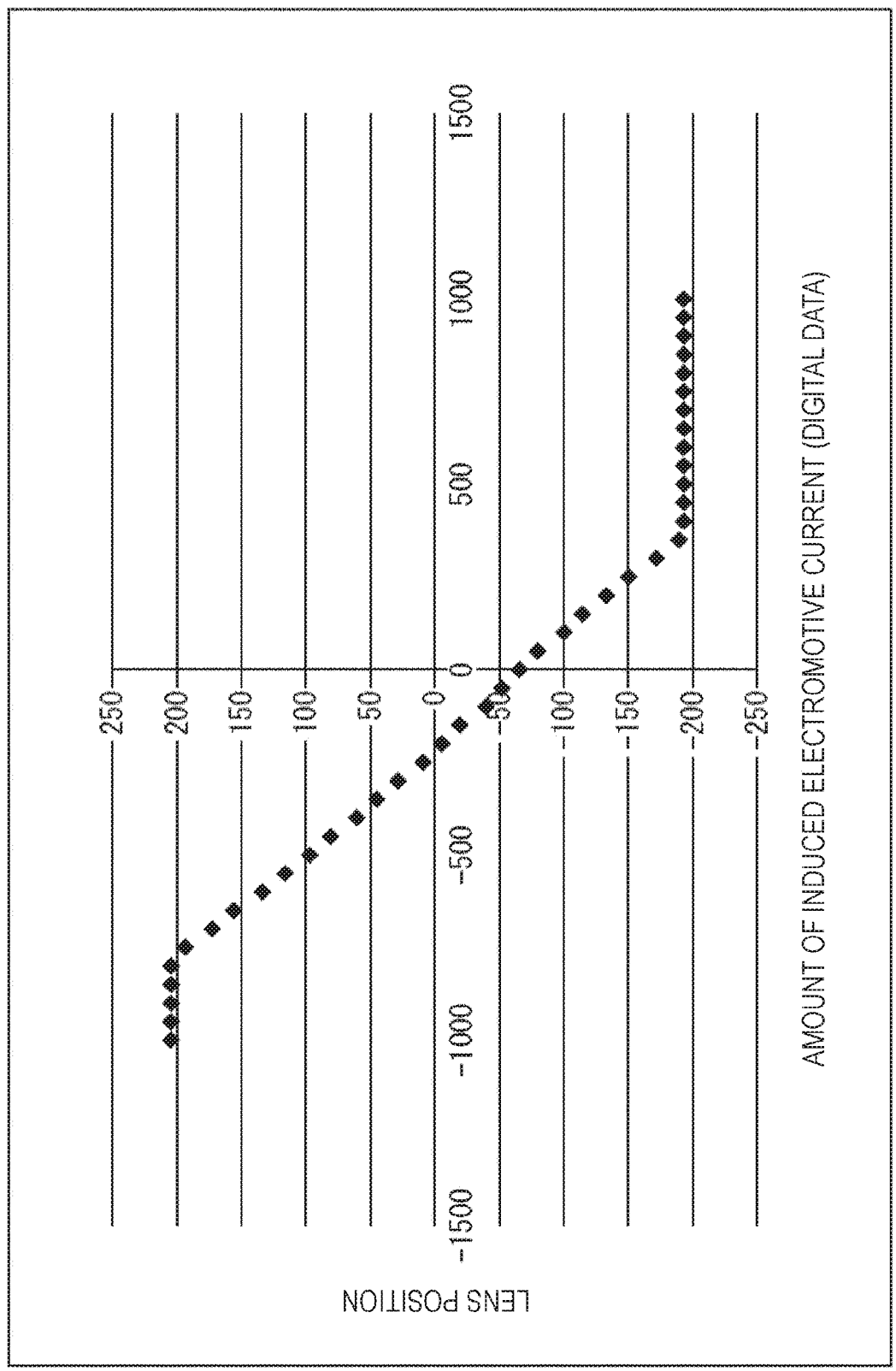
FIG. 5 is a diagram for describing a position of a lens and an amount of an induced electromotive force.

It has been described that a position of the lens 16 can be detected by detecting an induced electromotive force flowing into the coil 32. This is because a relationship as illustrated in FIG. 5 holds. FIG. 5 is a graph representing a relationship between a position of the lens 16 and an induced electromotive force detected. In FIG. 5, a vertical axis represents the position of the lens, and a horizontal axis represents an amount of a current of the induced electromotive force (digital data).

As described above, auto-focus is achieved by adjustment of a distance between the image sensor 11 and the lens 16. Accordingly, a distance between the lens 16 and the coil 32 also changes by auto-focus. Furthermore, in other words, as the lens 16 moves, the coil 21 (FIG. 2) in the actuator 18 also moves.

An influence of a magnetic field generated by a current flowing through the coil 21 on the coil 32 is large when the lens 16 (coil 21) is positioned near the coil 32, and is small when the lens 16 (coil 21) is positioned away from the coil 32. Thus, when the lens 16 (coil 21) is positioned near the coil 32, an induced electromotive force is large, and when the lens 16 (coil 21) is positioned away from the coil 32, an induced electromotive force is small.

This is represented by the graph as illustrated in FIG. 5. FIG. 5 is a graph illustrating a case where the lens 16 approaches closer to the coil 32 from a top toward a bottom in the drawing. In addition, in the graph of FIG. 5, a current value increases from left toward right in the drawing. In addition, in FIG. 5, a center position of a movable range of the lens is set to 0, and a current value is set to positive in a case where a current flows in a predetermined direction, and is set to negative in a case where a current flows in a direction opposite to the predetermined direction.

It can be read from the graph illustrated in FIG. 5 that an induced electromotive force changes linearly. From the matters described above, it can be read that an induced electromotive force and a position of the lens 16 are in a one-to-one relationship. Thus, by detecting an induced electromotive force flowing into the coil 32, a position of the lens 16 at that time can be detected.

By using such a relationship, for example, the detection circuit 31 can detect a position B of a position of the lens 16 after the AF control unit 53 exercises control for moving the lens 16 to a desired position A.

In addition, in a case where there is a deviation between the desired position A and the detected position B, the deviation can be corrected, and the lens 16 can be moved to the desired position A. Thus, it is possible to achieve high-performance lens movement.

Embodiment in which Detection Circuit is Formed on Housing

In the above-described embodiment, for example, as described with reference to FIG. 2, the case where the coil 32 connected to the detection circuit 31 is formed on the circuit board 13 on a lower side of the image sensor 11 has been described as an example. Hereinafter, the description will be continued on an assumption that a side where the lens 16 is present is an upper side and a side where the circuit board 13 is present is a lower side, with respect to the image sensor 11.

A magnetic field from the coil 21 included in the actuator 18 is generated not only on the circuit board 13 on the lower side of the image sensor 11 but also on the upper side (light receiving surface side) of the lens 16. That is, although the configuration in which a magnetic field from the coil 21 is received by the circuit board 13 on the lower side of the image sensor 11 to detect an induced electromotive force has been described as an example in the above-described embodiment, it is also possible to adopt a configuration in which a magnetic field from the coil 21 is received on the upper side of the image sensor 11, for example, by a housing 101 as illustrated in FIG. 6 to detect an induced electromotive force.

Figure 6:
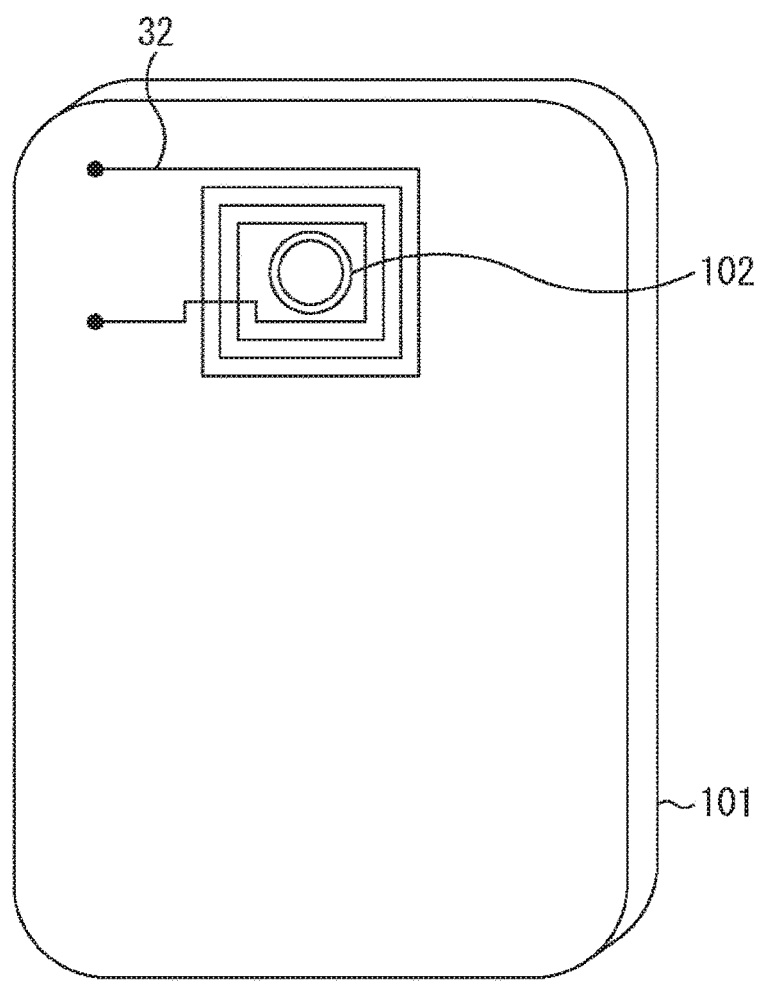
FIG. 6 is a diagram for describing a case where the coil is formed on a housing.

FIG. 6 illustrates a configuration example of an external appearance of a smartphone. Recent smartphones are often mounted with cameras. A lens portion of the camera is positioned at a portion of a lens window 102 provided in a portion of the housing 101.

Figure 7:
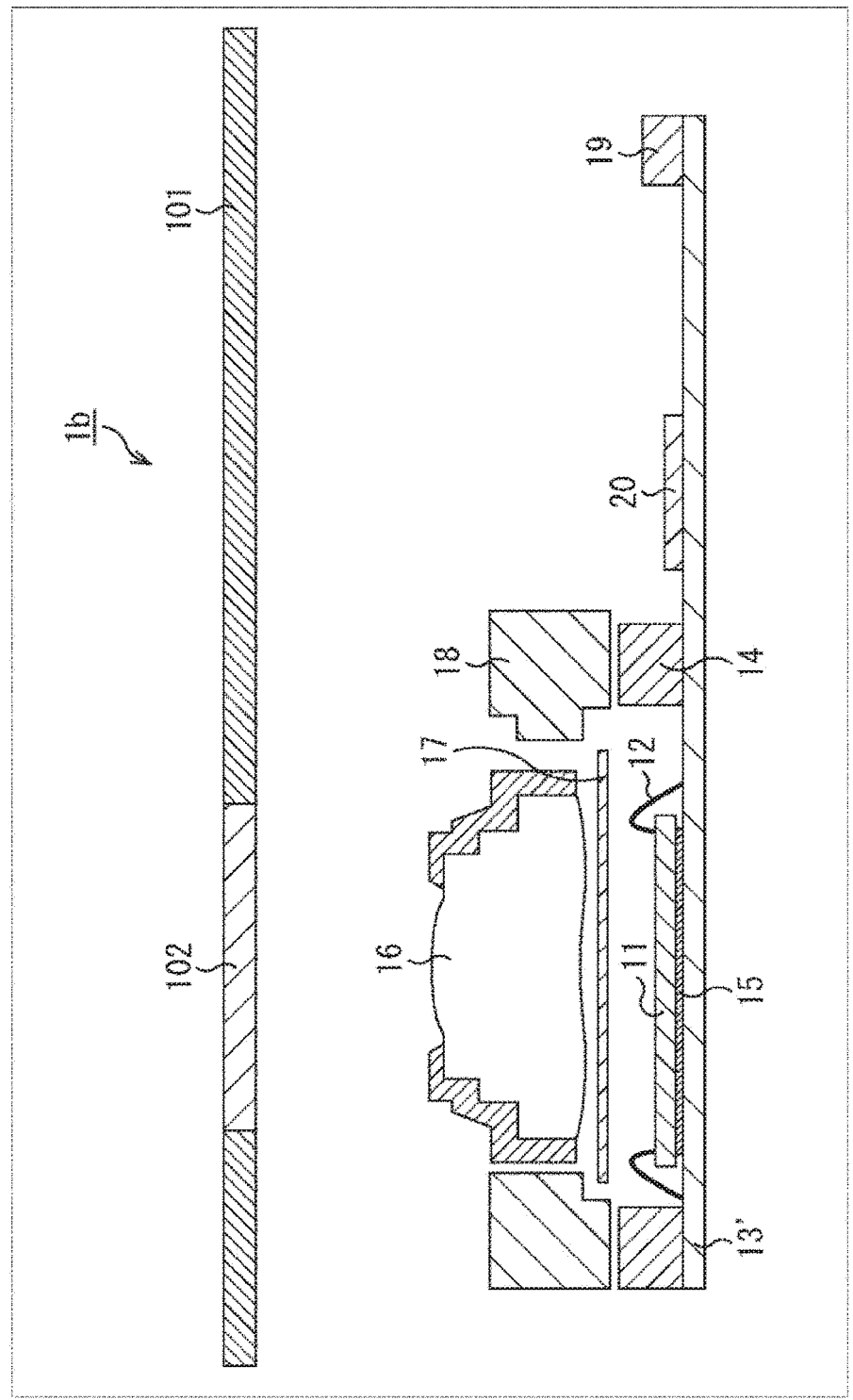
FIG. 7 is a diagram illustrating another configuration example of the imaging apparatus.

The coil 32 may be formed in an area around the lens window 102. FIG. 7 is a diagram illustrating an example of a cross-sectional configuration of the imaging apparatus 1 when the coil 32 is formed in an area around the lens window 102.

A configuration of an imaging apparatus 1b illustrated in FIG. 7 is basically similar to the configuration of an imaging apparatus 1a illustrated in FIG. 1, the same reference numerals are given to similar parts, and description thereof will be omitted.

The lens window 102 is positioned above the lens 16 of the imaging apparatus 1b. The imaging apparatus 1b is housed in the housing 101 in which the lens window 102 is formed. The coil 32 is formed around the lens window 102 as described with reference to FIG. 6.

When the imaging apparatus 1b is mounted in a housing or the like of a portable terminal such as a smartphone, the imaging apparatus 1b is mounted to a mechanism for fixing the imaging apparatus 1b, and is mounted in the housing of the portable terminal together with the fixing mechanism. In the imaging apparatus 1b illustrated in FIG. 8, a fixing mechanism 110 is provided. The coil 32 may be formed on the fixing mechanism 110.

Figure 9:
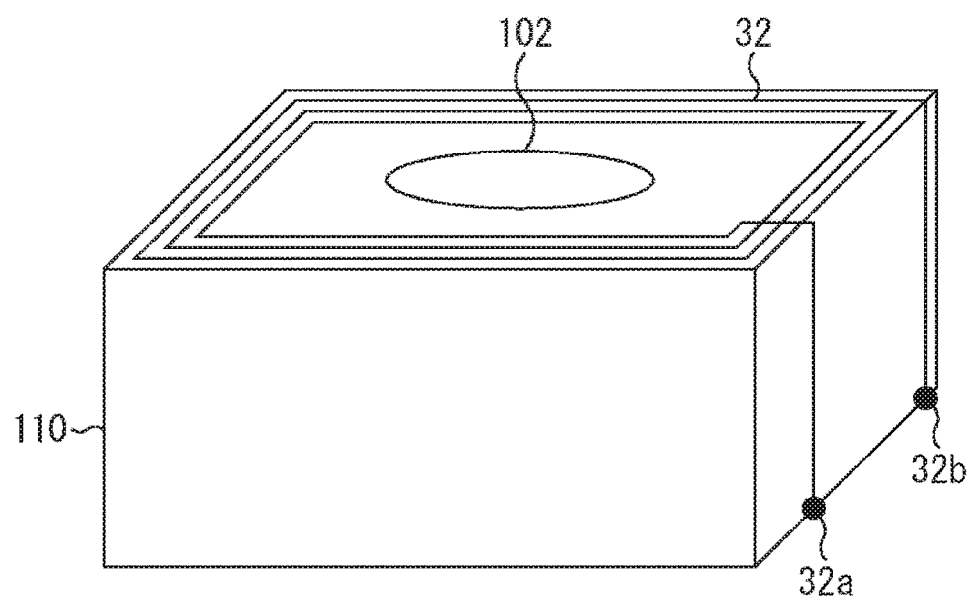
FIG. 9 is a diagram for describing a case where the coil is formed on the housing.

FIG. 9 illustrates a configuration example in a case where the coil 32 is formed on the fixing mechanism 110. The fixing mechanism 110 is also provided with the lens window 102 (at a position corresponding to the lens window 102 of the housing 101, a lens window 102 of approximately the same size is provided).

The coil 32 can be formed in an area around the lens window 102. In addition, a start point (start point 32a in FIG. 9) and an end point (end point 32b in FIG. 9) of the coil 32 are provided on a lower part of a side wall of the fixing mechanism 110.

Each of the start point 32a and the end point 32b of the coil 32 is formed to be in contact with a circuit board 13' (described with a dash to be distinguished from the circuit board 13 illustrated in FIG. 1). The detection circuit 31 (at least a wiring connected to the detection circuit 31) is formed on the circuit board 13', and the start point 32a and the end point 32b of the coil 32 can be connected to the detection circuit 31 formed on the circuit board 13'.

The coil 32 may be formed on the housing 101, or the coil 32 may be formed on the fixing mechanism 110. In addition, a part of the coil 32 may be formed on the housing 101, a part of the coil 32 may be formed on the fixing mechanism 110, and these coils 32 may be connected to form a single coil 32.

In addition, the coil 32 may be formed on the housing 101 even in a case where the fixing mechanism 110 is provided.

As described above, by forming the coil 32 on the housing 101 and/or the fixing mechanism 110, a magnetic field generated from the coil 21 (FIG. 2) constituting the actuator 18 can be captured by the coil 32, and similarly to the case of the imaging apparatus 1a described above, an induced electromotive force can be detected and a position of the lens 16 can be detected.

For example, by forming the coil 32 on the housing 101, even if the imaging apparatus 1 itself is not provided with the coil 32 (detection circuit 31), the imaging apparatus 1 can have a function of detecting a position of the lens 16 as a final product such as a smartphone.

That is, in the imaging apparatus 1a illustrated in FIG. 1, even for the imaging apparatus 1 (conventional imaging apparatus 1) in which the coil 32 (detection circuit 31) is not mounted on the circuit board 13, the coil 32 (detection circuit 31) can be provided on the housing 101 of a product including the imaging apparatus 1 or the fixing mechanism 110 used when the imaging apparatus 1 is mounted in the housing 101. Thus a final product can have a high-accuracy lens position detection mechanism.

In addition, even if the coil 32 is formed on the housing 101 or the fixing mechanism 110, the imaging apparatus 1 itself does not become large in size. Thus, the imaging apparatus 1 can be enhanced in performance without hindering size reduction of the imaging apparatus 1, and can be enhanced in performance at low cost.

Embodiment in which Detection Circuit is Formed in Spacer

In the embodiment described above, for example, as described with reference to FIG. 1, the mechanism has been described for detecting a position of the lens 16 by forming the coil 32 on the lower side of the image sensor 11, or on the upper side of the image sensor 11 as described with reference to FIG. 8.

Figure 10:
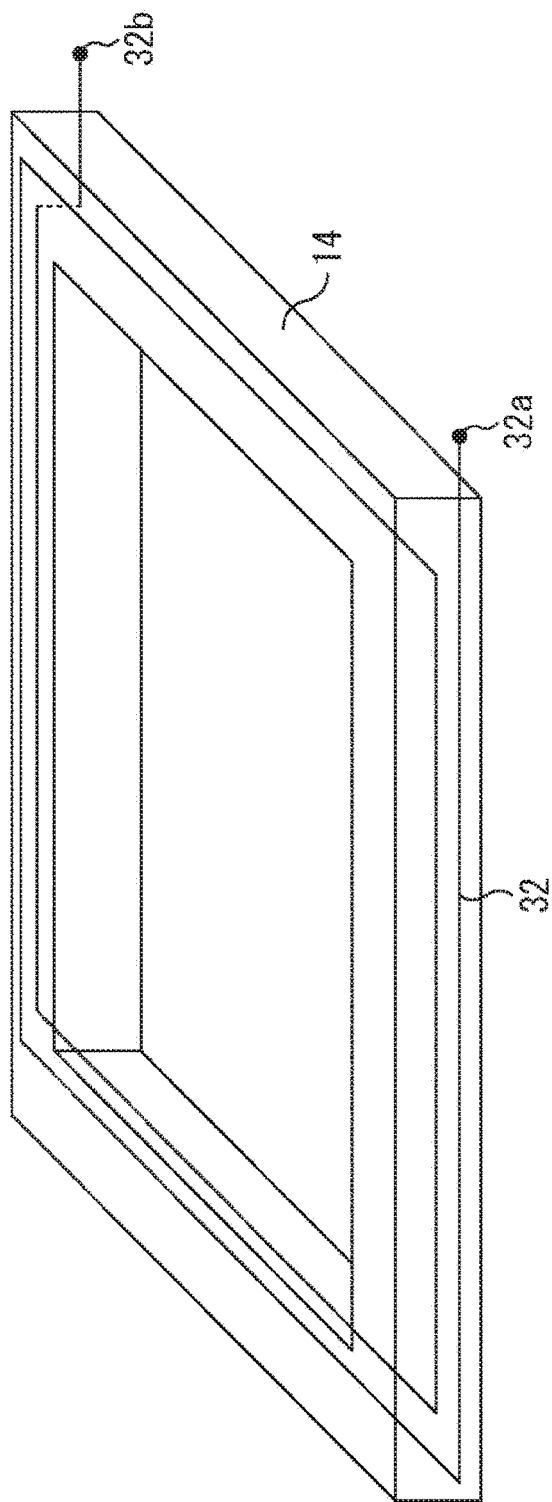
FIG. 10 is a diagram for describing a case where the coil is formed in a spacer.

As illustrated in FIG. 10, the coil 32 is formed in the spacer 14, and the start point 31a and the end point 32b for connection to the detection circuit 31 are formed at a portion of the spacer 14 in contact with the circuit board 13. A configuration of the imaging apparatus 1 in the case where the coil 32 is formed in the spacer 14 can be, for example, the same configuration as that of the imaging apparatus 1a illustrated in FIG. 1. However, the configuration of the imaging apparatus 1 is different from that of the imaging apparatus 1a in that the coil 32 is not formed on the circuit board 13. Here, although not illustrated, the imaging apparatus 1 including the spacer 14 illustrated in FIG. 10 will be described as an imaging apparatus 1c.

The imaging apparatus 1c can also detect a position of the lens 16 similarly to the case where the coil 32 is provided on the lower side of the image sensor 11 (imaging apparatus 1a) or the case where the coil 32 is provided on the upper side of the image sensor 11 (imaging apparatus 1b).

Also in the case of the imaging apparatus 1c, the imaging apparatus 1 itself does not become large in size. Thus, the imaging apparatus 1 can be enhanced in performance without hindering size reduction of the imaging apparatus 1, and can be enhanced in performance at low cost.

Other Configuration Examples of Imaging Apparatus

The basic configurations of the above-described imaging apparatuses 1a to 1c are similar to one another. As described above, the imaging apparatus 1a illustrated in FIG. 1 and the imaging apparatus 1c (not illustrated) have the same configuration, and the only difference is a portion where the coil 32 is formed. This difference does not affect the configuration of the imaging apparatus 1.

Figure 8:
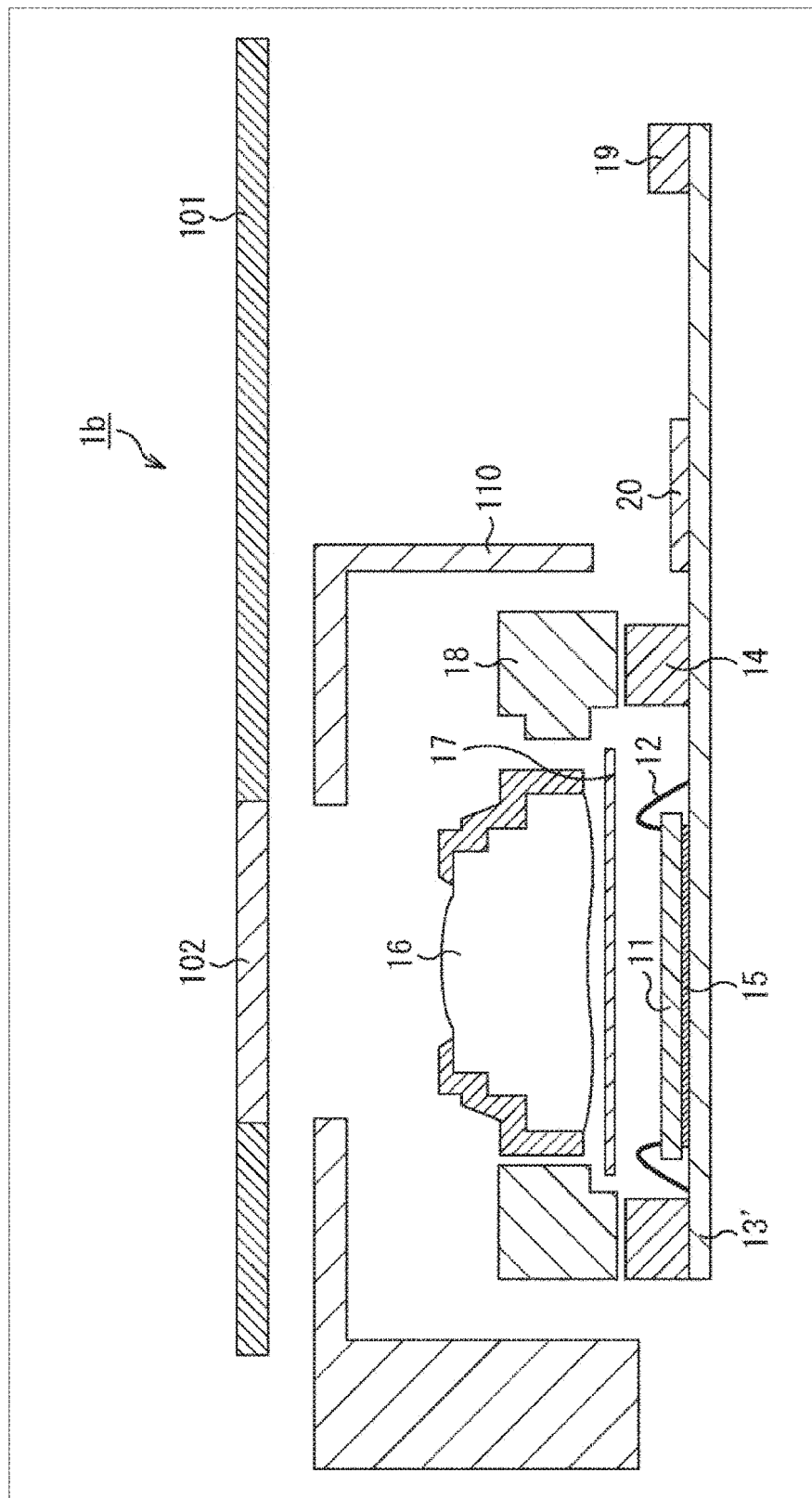
FIG. 8 is a diagram illustrating another configuration example of the imaging apparatus.

In addition, the imaging apparatus 1b illustrated in FIG. 8 is obtained by simply adding the fixing mechanism 110 to the imaging apparatus 1a illustrated in FIG. 1. The fixing mechanism 110 itself does not affect the configuration itself of the imaging apparatus 1a.

That is, the imaging apparatus 1 can have the same configuration regardless of where the coil 32 is provided. In other words, the present technology can be applied to any configuration of the imaging apparatus 1, not limited to the configurations of the imaging apparatuses 1a to 1c described above.

Now, other configurations of the imaging apparatus 1 will be described below. Note that each of the configurations described here is also merely an example and not a limitation.

Figure 11:
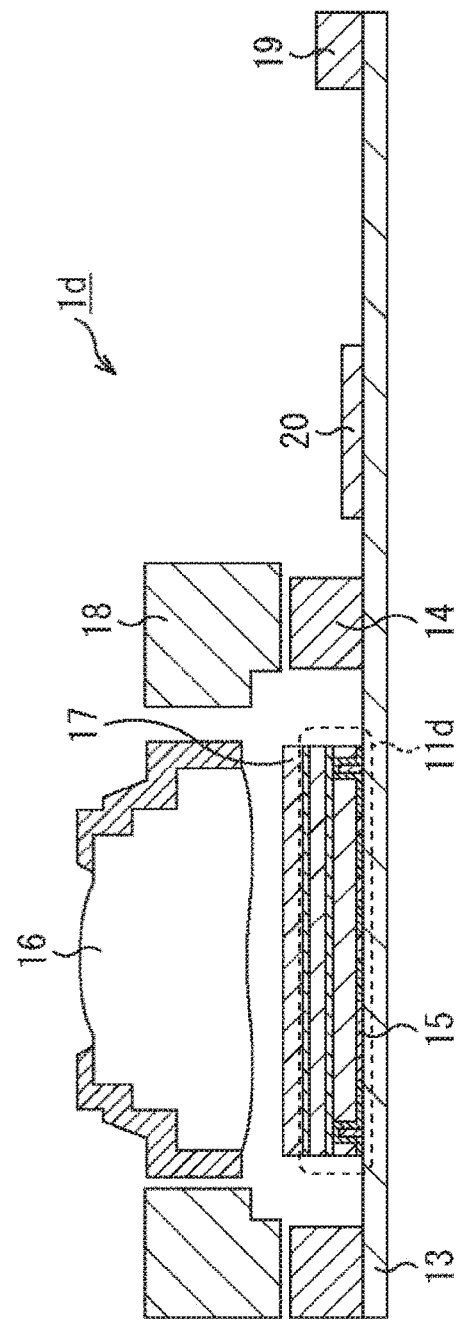
FIG. 11 is a diagram illustrating another configuration example of the imaging apparatus.

FIG. 11 is a diagram illustrating another configuration example of the imaging apparatus 1. An imaging apparatus 1d illustrated in FIG. 11 illustrates a configuration in a case where an image sensor 11d in a chip size package (CSP) shape is applied as the image sensor 11.

Even in the case where the image sensor 11d in the CSP shape is used as the image sensor 11, the coil 32 can be formed in/on the circuit board 13, the spacer 14, the housing 101, or the fixing mechanism 110, and a position of the lens 16 can be detected.

Figure 12:
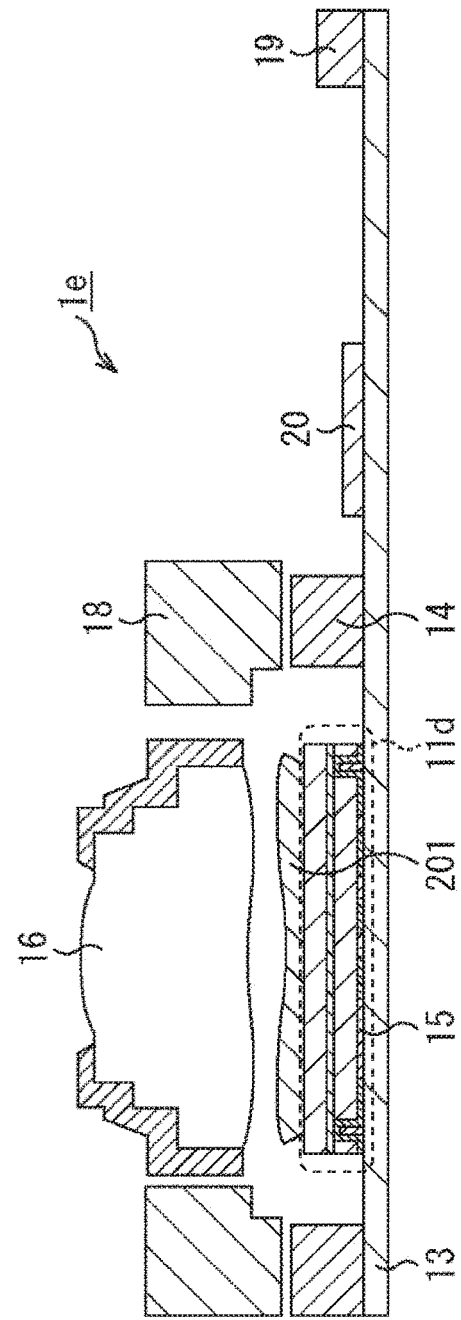
FIG. 12 is a diagram illustrating another configuration example of the imaging apparatus.

FIG. 12 is a diagram illustrating another configuration example of the imaging apparatus 1. Similarly to the imaging apparatus 1d illustrated in FIG. 11, an imaging apparatus 1e illustrated in FIG. 12 illustrates a configuration in a case where an image sensor 11e in the CSP shape is applied as the image sensor 11.

Furthermore, the imaging apparatus 1e illustrated in FIG. 12 has a function (filter) for cutting infrared rays on a glass board of the image sensor 11e in the CSP shape, and a lens 201 is formed on the glass board.

Thus, the thickness of the infrared cut filter can be reduced by providing the glass board of the image sensor 11e with the function for cutting infrared rays. With this arrangement, the height of the imaging apparatus 1e can be reduced. In addition, the fact that the lens 201 is formed on the glass board means that a lens at a lowermost layer of a plurality of lenses constituting the lens 16 is formed on the glass board of the image sensor 11e in the CSP shape. This configuration makes it possible to further reduce the thickness of the imaging apparatus 1e.

Also for such a thinned imaging apparatus 1e, the coil 32 can be formed in/on the circuit board 13, the spacer 14, the housing 101, or the fixing mechanism 110, and a position of the lens 16 can be detected.

Figure 13:
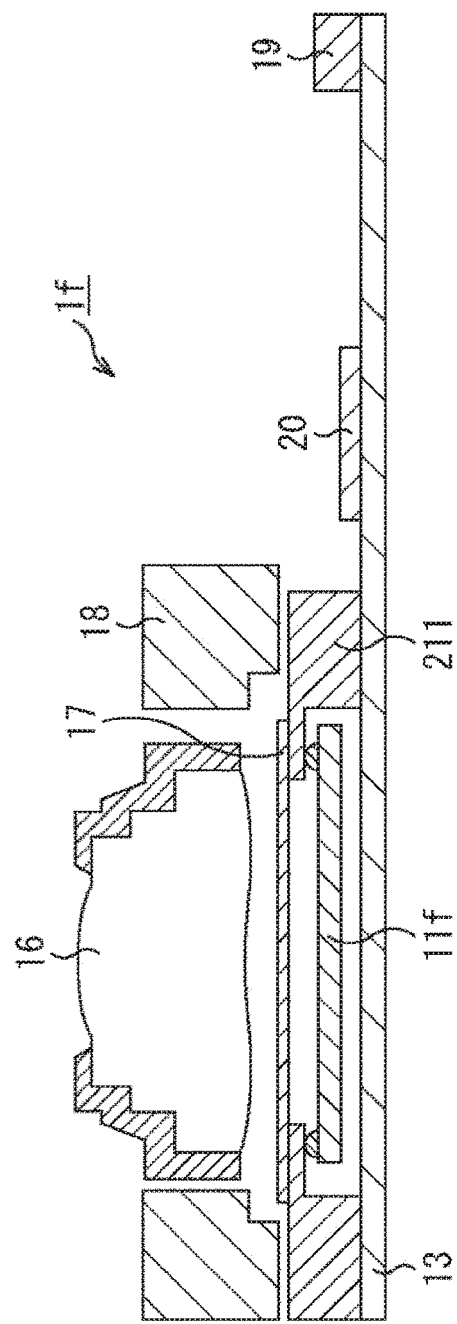
FIG. 13 is a diagram illustrating another configuration example of the imaging apparatus.

FIG. 13 is a diagram illustrating another configuration example of the imaging apparatus 1. An imaging apparatus 1f illustrated in FIG. 13 has a structure in which the image sensor 11 (for example, the image sensor 11 of the imaging apparatus 1a illustrated in FIG. 1) is an image sensor 11f of a flip-chip structure.

In the imaging apparatus 1f illustrated in FIG. 13, an electrical signal output from the image sensor 11f is output to the outside through a holder 211 having a circuit function. The holder 211 also has a holder function with the actuator 18, and the electrical signal from the image sensor 11f is output to the outside through the thin circuit board 13 connected to the holder 211.

Also for such an imaging apparatus 1f, the coil 32 can be formed in/on the circuit board 13, the spacer 14 (corresponding to the holder 211 in the imaging apparatus 1f), the housing 101, or the fixing mechanism 110, and a position of the lens 16 can be detected.

Figure 14:
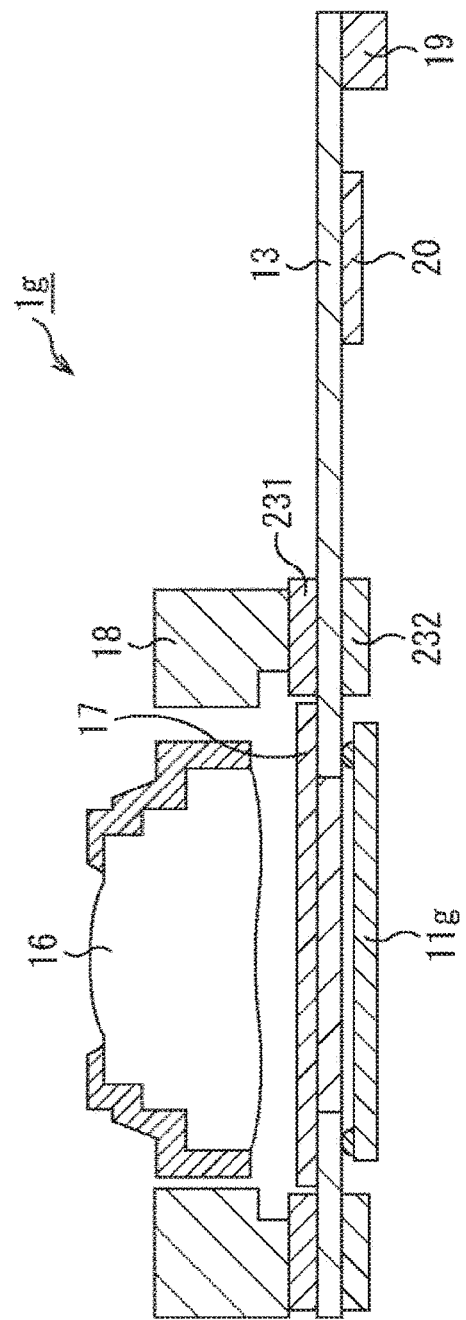
FIG. 14 is a diagram illustrating another configuration example of the imaging apparatus.

FIG. 14 is a diagram illustrating another configuration example of the imaging apparatus 1. An imaging apparatus 1g illustrated in FIG. 14 has an image sensor 11g of a flip-chip structure, similarly to the image sensor 11f of the imaging apparatus 1f illustrated in FIG. 13.

The imaging apparatus 1g illustrated in FIG. 14 has a structure in which the infrared cut filter 17 serves as a base material at the time of mounting of the imaging apparatus 1g, and the circuit board 13 is adhered to the infrared cut filter 17.

In addition, the imaging apparatus 1g includes a holder 231 having a circuit function, similarly to the imaging apparatus 1f illustrated in FIG. 13. In addition, as illustrated in FIG. 14, a protective material 232 is also provided for protecting, when the imaging apparatus 1g is mounted on a terminal, the image sensor 11g, in a case where the image sensor 11g is provided on a lower side (opposite to a side where the lens 16 is provided) of the circuit board 13.

Also for such an imaging apparatus 1g, the coil 32 can be formed in/on the circuit board 13, the spacer 14 (corresponding to the holder 231 or the protective material 232 in the imaging apparatus 1g), the housing 101, or the fixing mechanism 110, and a position of the lens 16 can be detected.

Figure 15:
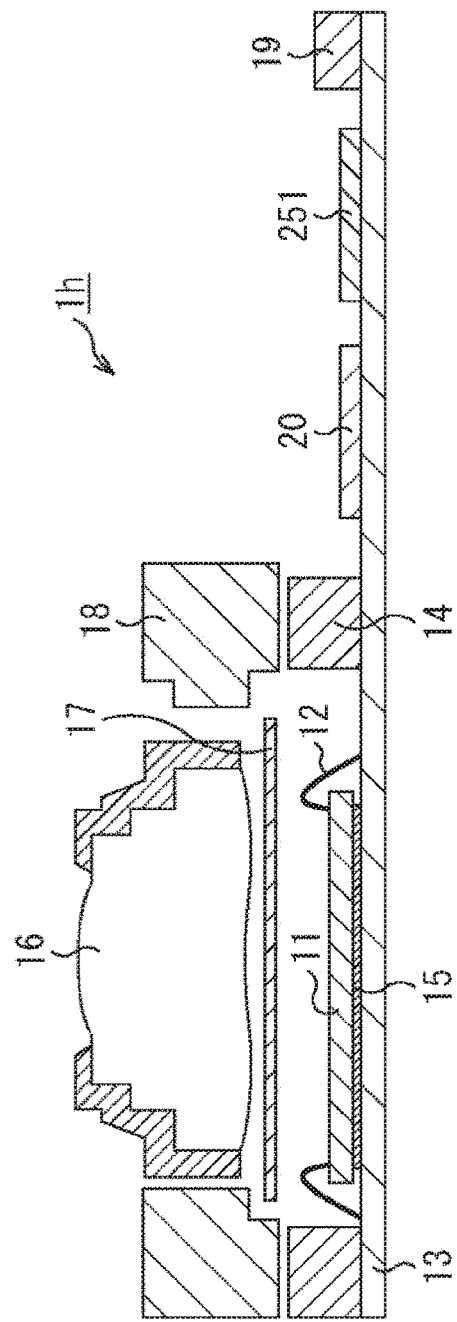
FIG. 15 is a diagram illustrating another configuration example of the imaging apparatus.

FIG. 15 is a diagram illustrating another configuration example of the imaging apparatus 1. An imaging apparatus 1h illustrated in FIG. 15 has a similar configuration to that of the imaging apparatus 1a illustrated in FIG. 1 except that a storage unit 251 is added to the imaging apparatus 1h. The storage unit 251 stores data for correcting variation between the individual imaging apparatuses 1.

An amount of an induced electromotive force for adjustment of a position of a lens changes depending on the number of turns and the size of the coil 21 (FIG. 2) of the actuator 18 and a formation state (the number of turns, the number of layers of the formed circuit board 13, and the like) of the coil 32 (FIG. 3) of the circuit board 13. Thus, variation of the induced electromotive force is measured at the time of manufacturing of the imaging apparatus 1h, and an adjustment value for adjusting the variation is stored in the storage unit 251.

Then, at the time of actual control, the adjustment value stored in the storage unit 251 is used and processed in order to correct the variation between the individual imaging apparatuses 1. With this arrangement, it is possible to detect and adjust a position of the lens 16, with the variation between the individual imaging apparatuses 1 improved.

Note that a mounting position of the storage unit 251 may be on the circuit board 13 as illustrated in FIG. 15 or may be mounted outside the imaging apparatus 1h. In addition, the imaging apparatus 1h obtained by mounting the storage unit 251 to the imaging apparatus 1a has been described here as an example. However, as a matter of course, it is possible to mount the storage unit 251 to the imaging apparatuses 1b to 1g.

Also for such an imaging apparatus 1h, the coil 32 can be formed in/on the circuit board 13, the spacer 14, the housing 101, or the fixing mechanism 110, and a position of the lens 16 can be detected.

According to the present technology, power consumption can be reduced by PWM driving a lens. In addition, when PWM driving is performed, it is possible to detect an induced electromotive force generated by a magnetic field generated by (a coil in) an actuator that drives the lens.

In addition, a position of the lens can be detected by detecting such an induced electromotive force. Furthermore, by detecting the position of the lens, it is possible to correct the position in a case where position deviation occurs.

According to the present technology, it is possible to achieve performance enhancement and size reduction of an imaging apparatus by controlling a focal position of a lens of the imaging apparatus.

The imaging apparatus 1 described above can be used for a digital video camera, a digital still camera, and the like. In addition, the imaging apparatus 1 described above can also be used for an image input camera such as a surveillance camera and an on-vehicle camera. In addition, the imaging apparatus 1 described above can also be used for electronic apparatuses such as a scanner device, a facsimile device, a television telephone device, and a mobile terminal device with a camera.

Application Example to Endoscopic Surgery System

The technology according to the present disclosure is applicable to a variety of products. For example, the technology according to the present disclosure may be applied to an endoscopic surgery system.

Figure 16:
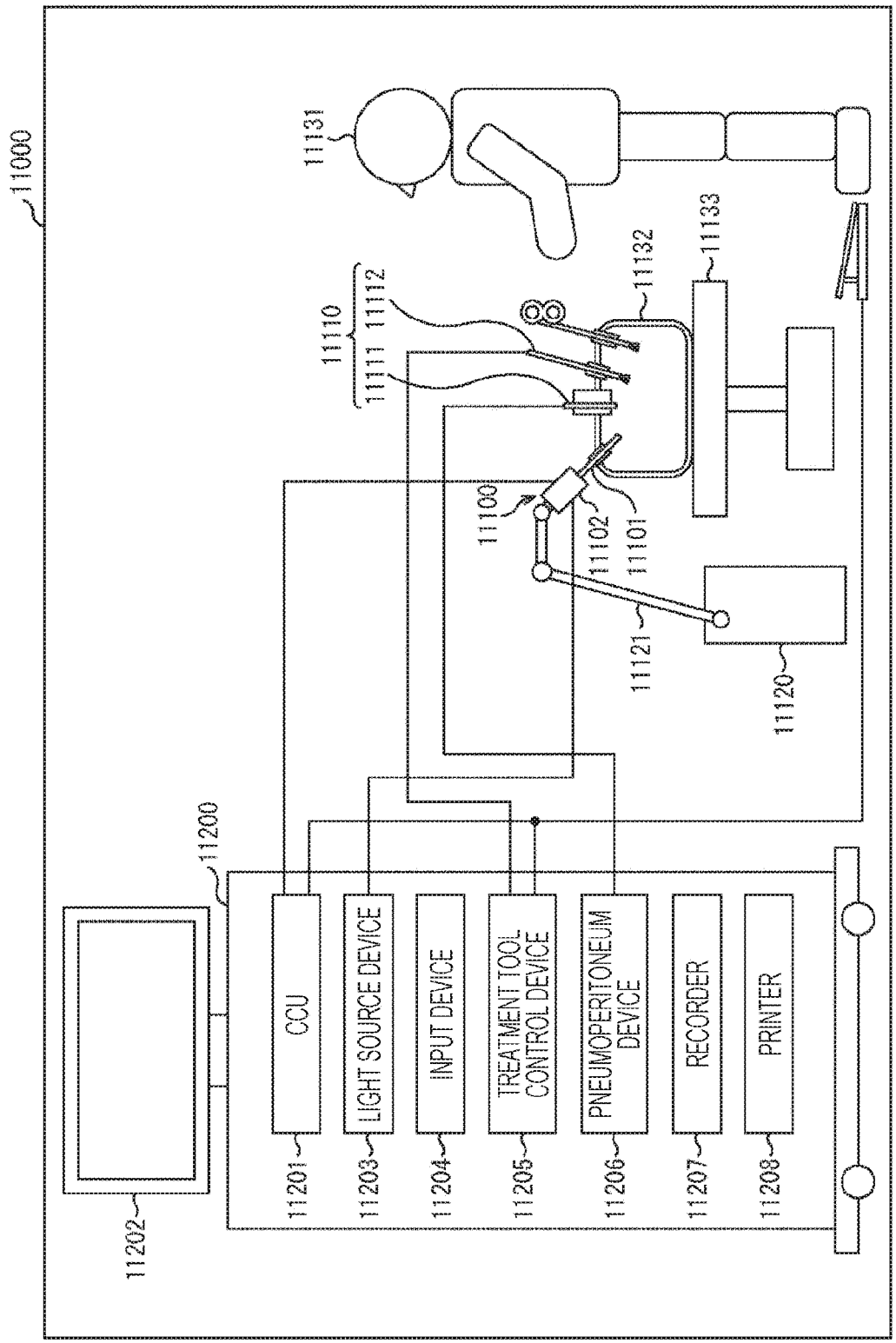
FIG. 16 is a diagram illustrating an example of a schematic configuration of an endoscopic surgery system.

FIG. 16 is a diagram illustrating an example of a schematic configuration of an endoscopic surgery system to which the technology according to the present disclosure (the present technology) can be applied.

FIG. 16 illustrates a surgeon (physician) 11131 performing surgery on a patient 11132 on a patient bed 11133, using an endoscopic surgery system 11000. As illustrated, the endoscopic surgery system 11000 includes an endoscope 11100, other surgical tools 11110 such as a pneumoperitoneum tube 11111 and an energy treatment tool 11112, a support arm device 11120 that supports the endoscope 11100, and a cart 11200 on which various devices for an endoscopic surgery are mounted.

The endoscope 11100 includes a lens barrel 11101 in which an area having a predetermined length from a tip is inserted into a body cavity of the patient 11132, and a camera head 11102 connected to a base end of the lens barrel 11101. In the illustrated example, the endoscope 11100 configured as a so-called rigid mirror having the rigid lens barrel 11101 is illustrated. However, the endoscope 11100 may be configured as a so-called flexible mirror having a flexible lens barrel.

At the tip of the lens barrel 11101, an opening into which an objective lens is fitted is provided. A light source device 11203 is connected to the endoscope 11100, and light generated by the light source device 11203 is guided to the tip of the lens barrel by a light guide extending inside the lens barrel 11101, and is emitted through the objective lens toward an observation target in the body cavity of the patient 11132. Note that the endoscope 11100 may be a forward-viewing endoscope, an oblique-viewing endoscope, or a side-viewing endoscope.

An optical system and an image sensor are provided inside the camera head 11102, and reflected light (observation light) from the observation target is collected on the image sensor by the optical system. The observation light is photoelectrically converted by the image sensor to generate an electrical signal corresponding to the observation light, that is, an image signal corresponding to an observation image. The image signal is transmitted as RAW data to a camera control unit (CCU) 11201.

The CCU 11201 includes a central processing unit (CPU) and a graphics processing unit (GPU), and integrally controls operations of the endoscope 11100 and a display device 11202. Furthermore, the CCU 11201 receives an image signal from the camera head 11102 and performs, on the image signal, for example, various types of image processing for displaying an image based on the image signal, such as development processing (demosaicing processing).

Under control of the CCU 11201, the display device 11202 displays an image based on an image signal subjected to image processing by the CCU 11201.

The light source device 11203 includes, for example, a light source such as a light emitting diode (LED), and supplies the endoscope 11100 with irradiation light at the time of capturing an image of a surgical site and the like.

An input device 11204 is an input interface to the endoscopic surgery system 11000. A user can input various types of information and an instruction to the endoscopic surgery system 11000 through the input device 11204. For example, a user inputs an instruction to change an imaging condition (a type of irradiation light, a magnification, a focal length, and the like) by the endoscope 11100.

A treatment tool control device 11205 controls driving of the energy treatment tool 11112 for ablation of tissue, incision, sealing of a blood vessel, and the like. A pneumoperitoneum device 11206 delivers gas into a body cavity of the patient 11132 through the pneumoperitoneum tube 11111 in order to inflate the body cavity, for the purpose of securing a field of view by the endoscope 11100 and securing a working space for the surgeon. A recorder 11207 is a device capable of recording various types of information related to surgery. A printer 11208 is a device capable of printing various types of information related to surgery in various formats such as text, images, or graphs.

Note that the light source device 11203, which supplies the endoscope 11100 with irradiation light when capturing an image of a surgical site, includes a white light source including an LED, a laser light source, or a combination thereof, for example. In a case where the white light source includes a combination of RGB laser light sources, output intensity and output timing of each color (each wavelength) can be controlled with high accuracy, and thus a white balance of a captured image can be adjusted in the light source device 11203. In addition, in this case, it is also possible to capture images corresponding to R, G, and B in a time-division manner by irradiating an observation target with laser light from each of the RGB laser light sources in a time-division manner, and controlling driving of an image sensor of the camera head 11102 in synchronization with the irradiation timing. According to such a method, a color image can be obtained without providing the image sensor with a color filter.

In addition, driving of the light source device 11203 may be controlled to change intensity of light to be output at predetermined intervals. By controlling driving of an image sensor of the camera head 11102 in synchronization with the timing of changing the light intensity to acquire images in a time-division manner, and combining the images together, it is possible to generate a high dynamic range image without so-called underexposure and overexposure.

In addition, the light source device 11203 may be capable of supplying light in a predetermined wavelength band compatible with special light observation. In the special light observation, for example, so-called narrow band imaging (NBI) is performed, in which an image of a predetermined tissue such as a blood vessel in a superficial portion of a mucous membrane is captured at a high contrast by emitting light in a narrow band compared to irradiation light during normal observation (that is, white light) by using wavelength dependency of light absorption by a body tissue. Alternatively, in the special light observation, fluorescent observation in which an image is obtained by fluorescent light generated by irradiation of excitation light may be performed. In the fluorescent observation, it is possible to, for example, irradiate a body tissue with excitation light to observe fluorescent light from the body tissue (autofluorescence observation), or locally inject a reagent such as indocyanine green (ICG) into a body tissue while also irradiating the body tissue with excitation light corresponding to a fluorescence wavelength of the reagent to obtain a fluorescent image. The light source device 11203 can be capable of supplying narrow-band light and/or excitation light corresponding to such special light observation.

Figure 17:
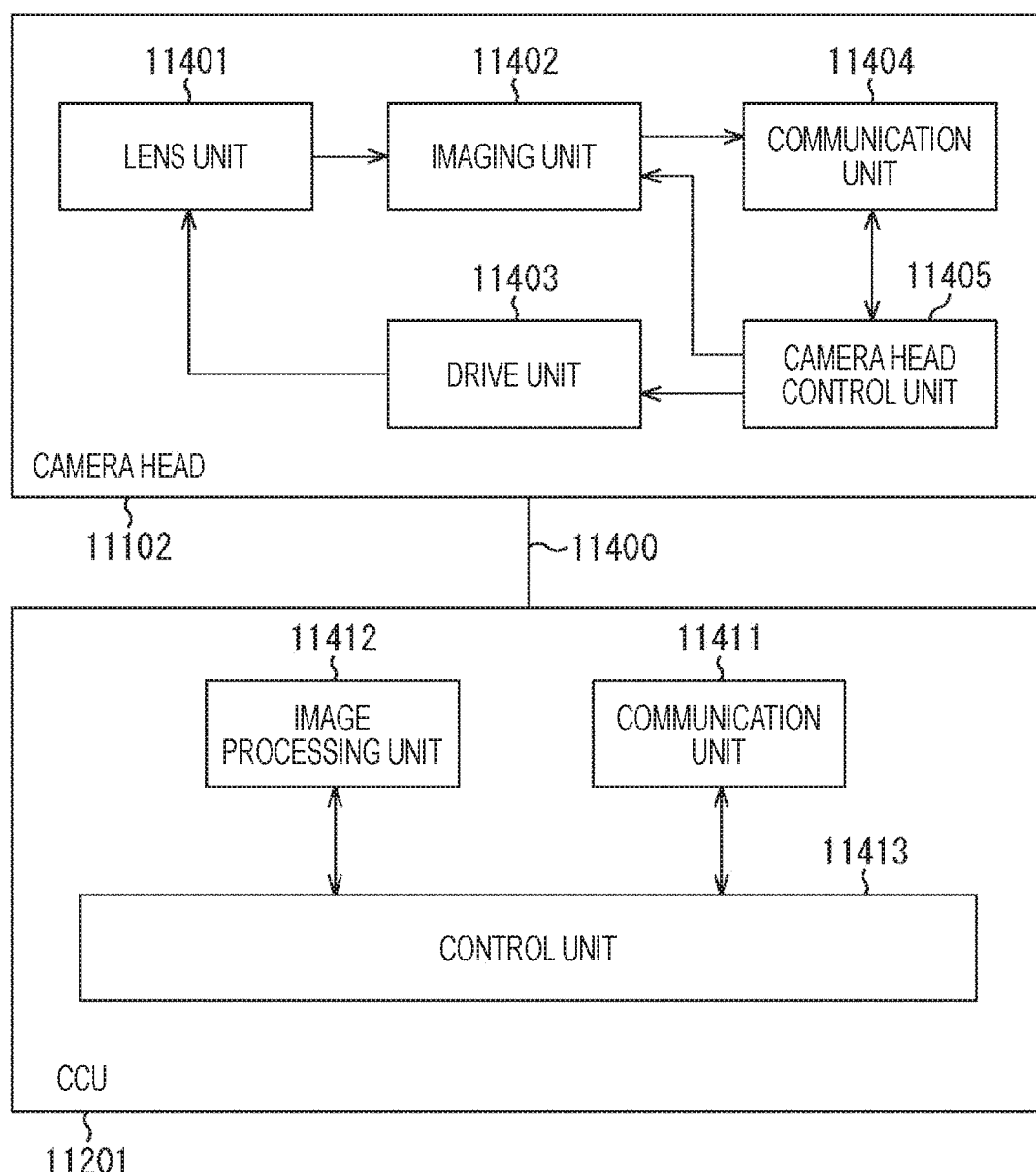
FIG. 17 is a block diagram illustrating an example of functional configurations of a camera head and a CCU.

FIG. 17 is a block diagram illustrating an example of functional configurations of the camera head 11102 and the CCU 11201 illustrated in FIG. 16.

The camera head 11102 includes a lens unit 11401, an imaging unit 11402, a drive unit 11403, a communication unit 11404, and a camera head control unit 11405. The CCU 11201 includes a communication unit 11411, an image processing unit 11412, and a control unit 11413. The camera head 11102 and the CCU 11201 are communicably connected to each other by a transmission cable 11400.

The lens unit 11401 is an optical system provided at a connection portion with the lens barrel 11101. Observation light taken in from the tip of the lens barrel 11101 is guided to the camera head 11102 and enters the lens unit 11401. The lens unit 11401 includes a combination of a plurality of lenses including a Zoom lens and a focus lens.

The imaging unit 11402 includes an image sensor. The number of image sensors constituting the imaging unit 11402 may be one (a so-called single-plate type) or plural (a so-called multi-plate type). In a case where the imaging unit 11402 is configured as that of the multi-plate type, for example, an image signal corresponding to each of RGB may be generated by each image sensor and a color image may be obtained by combining the image signals. Alternatively, the imaging unit 11402 may include a pair of image sensors for acquiring image signals for a right eye and a left eye compatible with three-dimensional (3D) display. The 3D display enables the surgeon 11131 to more accurately grasp the depth of a biological tissue in a surgical site. Note that, in the case where the imaging unit 11402 is configured as that of a multi-plate type, a plurality of systems of lens units 11401 may be provided corresponding to the respective image sensors.

In addition, the imaging unit 11402 may not necessarily be provided in the camera head 11102. For example, the imaging unit 11402 may be provided inside the lens barrel 11101, just behind the objective lens.

The drive unit 11403 includes an actuator, and moves the zoom lens and the focusing lens of the lens unit 11401 by a predetermined distance along an optical axis, under control of the camera head control unit 11405. With this arrangement, a magnification and a focus of a captured image by the imaging unit 11402 can be appropriately adjusted.

The communication unit 11404 includes a communication device for transmitting and receiving various types of information to and from the CCU 11201. The communication unit 11404 transmits, as RAW data, an image signal obtained from the imaging unit 11402 to the CCU 11201 through the transmission cable 11400.

In addition, the communication unit 11404 receives a control signal for controlling driving of the camera head 11102 from the CCU 11201 and supplies the control signal to the camera head control unit 11405. The control signal includes, for example, information associated with imaging conditions such as information that a frame rate of a captured image is designated, information that an exposure value upon capturing an image is designated, and/or information that a magnification and a focus of a captured image are designated.

Note that the above-described imaging conditions such as a frame rate, an exposure value, a magnification, and a focus may be designated appropriately by a user, or may be set automatically by the control unit 11413 of the CCU 11201 on the basis of an acquired image signal. In the latter case, a so-called auto exposure (AE) function, auto-focus (AF) function, and auto white balance (AWB) function are mounted in the endoscope 11100.

The camera head control unit 11405 controls driving of the camera head 11102 on the basis of a control signal from the CCU 11201 received through the communication unit 11404.

The communication unit 11411 includes a communication device for transmitting and receiving various types of information to and from the camera head 11102. The communication unit 11411 receives an image signal transmitted from the camera head 11102 through the transmission cable 11400.

In addition, the communication unit 11411 transmits, to the camera head 11102, a control signal for controlling driving of the camera head 11102. An image signal and a control signal can be transmitted by telecommunication, optical communication, or the like.

The image processing unit 11412 performs various types of image processing on an image signal which is RAW data transmitted from the camera head 11102.

The control unit 11413 exercises various types of control related to capturing an image of a surgical site or the like by the endoscope 11100 and display of a captured image obtained by capturing an image of the surgical site or the like. For example, the control unit 11413 generates a control signal for controlling driving of the camera head 11102.

In addition, the control unit 11413 causes the display device 11202 to display a captured image in which a surgical site or the like is captured, on the basis of an image signal subjected to image processing by the image processing unit 11412. At this time, the control unit 11413 may use various types of image recognition technology to recognize various objects in the captured image. For example, by detecting the shape, color, and the like of an edge of an object included in the captured image, the control unit 11413 can recognize a surgical tool such as forceps, a specific biological site, bleeding, mist during usage of the energy treatment tool 11112, and the like. When causing the display device 11202 to display the captured image, the control unit 11413 may superimpose and display various types of surgical support information on the image of the surgical site using a recognition result. The surgical support information is superimposed and displayed to be presented to the surgeon 11131, so that a burden on the surgeon 11131 can be reduced and the surgeon 11131 can reliably proceed with surgery.

The transmission cable 11400 that connects the camera head 11102 and the CCU 11201 is an electrical signal cable compatible with communication of an electrical signal, an optical fiber compatible with optical communication, or a composite cable composed by combining the electrical signal cable and the optical fiber.

Here, in the illustrated example, communication is performed in a wired manner using the transmission cable 11400, but communication between the camera head 11102 and the CCU 11201 may be performed wirelessly.

Note that, although the endoscopic surgery system has been described as an example here, the technology according to the present disclosure may be applied to other systems, for example, a microscopic surgery system.

Application Example to Mobile Body

The technology according to the present disclosure is applicable to a variety of products. For example, the technology according to the present disclosure may be implemented as a device mounted on any type of a mobile body such as an automobile, an electric vehicle, a hybrid electric vehicle, a motorcycle, a bicycle, a personal mobility, an airplane, a drone, a ship, or a robot.

Figure 18:
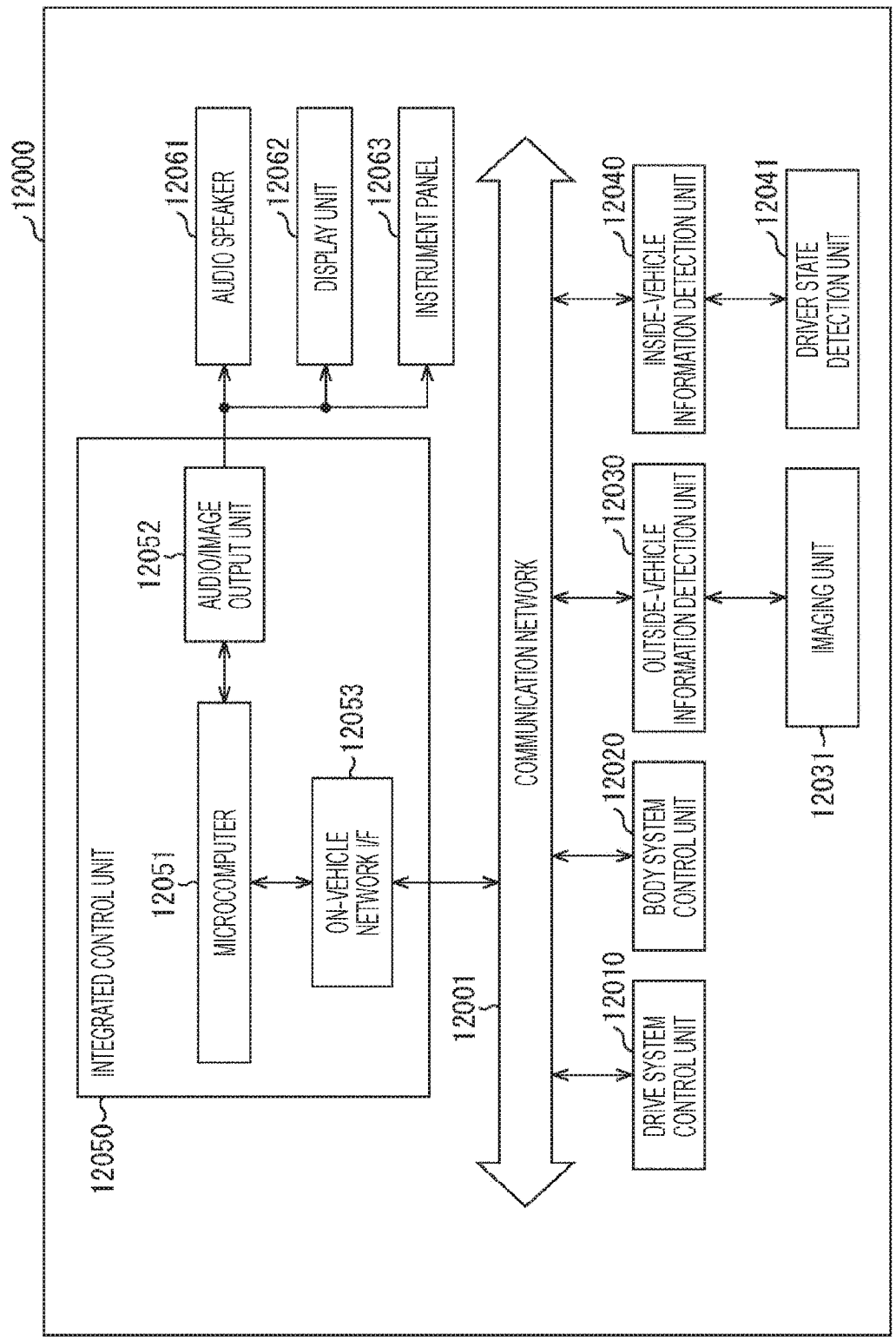
FIG. 18 is a block diagram illustrating an example of a schematic configuration of a vehicle control system.

FIG. 18 is a block diagram illustrating a schematic configuration example of a vehicle control system as an example of a mobile body control system to which the technology according to the present disclosure can be applied.

A vehicle control system 12000 includes a plurality of electronic control units connected via a communication network 12001. In an example illustrated in FIG. 18, the vehicle control system 12000 includes a drive system control unit 12010, a body system control unit 12020, an outside-vehicle information detection unit 12030, an inside-vehicle information detection unit 12040, and an integrated control unit 12050. In addition, as a functional configuration of the integrated control unit 12050, a microcomputer 12051, an audio/image output unit 12052, and an on-vehicle network interface (I/F) 12053 are illustrated.

The drive system control unit 12010 controls operations of devices related to a drive system of a vehicle in accordance with various programs. For example, the drive system control unit 12010 functions as a control device for a drive force generation device such as an internal combustion engine or a drive motor for generating a drive force of a vehicle, a drive force transmission mechanism for transmitting a drive force to wheels, a steering mechanism for adjusting a steering angle of a vehicle, a braking device for generating a braking force of a vehicle, and the like.

The body system control unit 12020 controls operations of various devices mounted on a vehicle body in accordance with various programs. For example, the body system control unit 12020 functions as a control device for a keyless entry system, a smart key system, a power window device, or various lamps such as a head lamp, a back lamp, a brake lamp, a blinker, or a fog lamp. In this case, radio waves transmitted from a mobile device as an alternative to a key or signals of various switches can be input to the body system control unit 12020. The body system control unit 12020 receives the input of the radio waves or the signals, and controls a door lock device, the power window device, the lamps, or the like of the vehicle.

The outside-vehicle information detection unit 12030 detects information of the outside of a vehicle that mounts the vehicle control system 12000. For example, an imaging unit 12031 is connected to the outside-vehicle information detection unit 12030. The outside-vehicle information detection unit 12030 causes the imaging unit 12031 to capture an image of the outside of the vehicle, and receives the captured image. The outside-vehicle information detection unit 12030 may perform, on the basis of the received image, object detection processing of detecting an object such as a person, a vehicle, an obstacle, a sign, or a letter on a road surface, or distance detection processing.

The imaging unit 12031 is an optical sensor that receives light and outputs an electrical signal according to an amount of the received light. The imaging unit 12031 can output the electrical signal as an image, or can output the electrical signal as ranging information. In addition, the light received by the imaging unit 12031 may be visible light or may be non-visible light such as infrared rays.

The inside-vehicle information detection unit 12040 detects information inside a vehicle. The inside-vehicle information detection unit 12040 is connected to, for example, a driver state detection unit 12041 that detects a state of a driver. The driver state detection unit 12041 includes, for example, a camera that captures an image of a driver, and the inside-vehicle information detection unit 12040 may calculate a degree of fatigue or a degree of concentration of the driver, or may determine whether or not the driver falls asleep, on the basis of detection information input from the driver state detection unit 12041.

The microcomputer 12051 calculates a control target value of the drive force generation device, the steering mechanism, or the braking device on the basis of the information outside and inside a vehicle acquired by the outside-vehicle information detection unit 12030 or the inside-vehicle information detection unit 12040, and can output a control command to the drive system control unit 12010. For example, the microcomputer 12051 can exercise cooperative control for a purpose of implementing functions of an advanced driver assistance system (ADAS) including collision avoidance or shock mitigation for a vehicle, follow-up traveling based on an inter-vehicle distance, vehicle speed maintaining traveling, a warning of collision of a vehicle, a warning of lane deviation of a vehicle, or the like.

In addition, the microcomputer 12051 can exercise cooperative control for performing automatic driving or the like for autonomous travel without depending on an operation of a driver, by controlling the drive force generation device, the steering mechanism, the braking device, or the like on the basis of information about surroundings of a vehicle acquired by the outside-vehicle information detection unit 12030 or the inside-vehicle information detection unit 12040.

In addition, the microcomputer 12051 can output a control command to the body system control unit 12020 on the basis of information outside the vehicle acquired by the outside-vehicle information detection unit 12030. For example, the microcomputer 12051 can exercise cooperative control for a purpose of achieving non-glare by controlling a head lamp in accordance with a position of a leading vehicle or an oncoming vehicle detected by the outside-vehicle information detection unit 12030, switching a high beam to a low beam, and the like.

The audio/image output unit 12052 transmits an output signal of at least one of audio or an image to an output device capable of visually or aurally notifying an occupant of a vehicle or the outside of the vehicle of information. In the example of FIG. 18, an audio speaker 12061, a display unit 12062, and an instrument panel 12063 are exemplified as output devices. The display unit 12062 may include at least one of an on-board display or a head-up display, for example.

Figure 19:
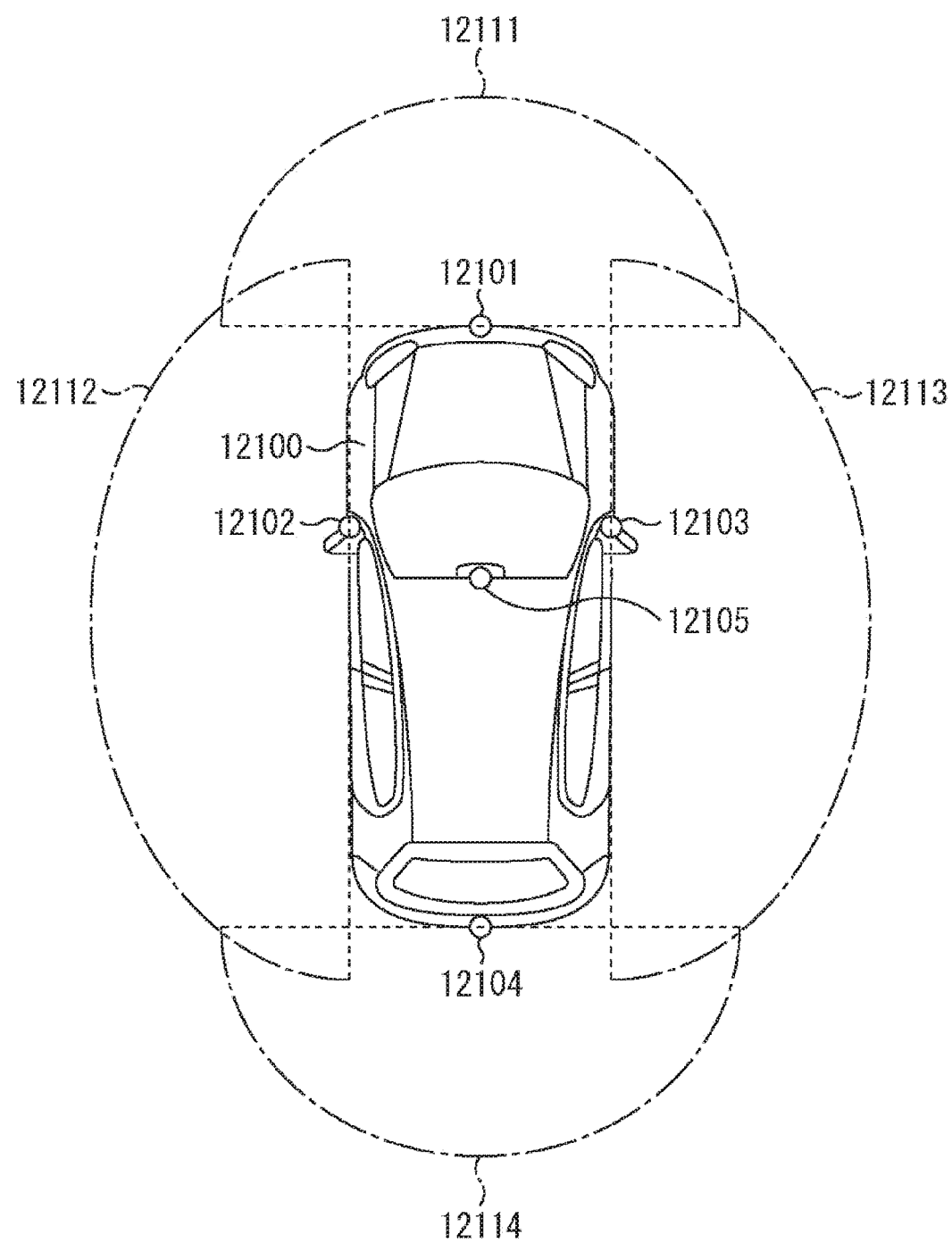
FIG. 19 is an explanatory view illustrating an example of installation positions of an outside vehicle information detection unit and an imaging unit.

FIG. 19 is a diagram illustrating an example of an installation position of the imaging unit 12031.

In FIG. 19, a vehicle 12100 includes, as the imaging unit 12031, imaging units 12101, 12102, 12103, 12104, and 12105.

The imaging units 12101, 12102, 12103, 12104, and 12105 are provided at positions such as a front nose, side mirrors, a rear bumper, a back door, and an upper portion of a windshield in an interior of the vehicle 12100, for example. The imaging unit 12101 provided on the front nose and the imaging unit 12105 provided on the upper portion of the windshield in the interior of the vehicle mainly acquire images in front of the vehicle 12100. The imaging units 12102 and 12103 provided on the side mirrors mainly acquire images on sides of the vehicle 12100. The imaging unit 12104 provided on the rear bumper or the back door mainly acquires an image behind the vehicle 12100. The images in front of the vehicle 12100, which are acquired by the imaging units 12101 and 12105, are mainly used for detection of a leading vehicle, a pedestrian, an obstacle, a traffic light, a traffic sign, a lane, or the like.

Note that FIG. 19 illustrates an example of imaging ranges of the imaging units 12101 to 12104. An imaging range 12111 indicates the imaging range of the imaging unit 12101 provided on the front nose, imaging ranges 12112 and 12113 indicate the imaging ranges of the imaging units 12102 and 12103 provided on the side mirrors, and an imaging range 12114 indicates the imaging range of the imaging unit 12104 provided on the rear bumper or the back door. For example, a bird's-eye view image of the vehicle 12100 as viewed from above can be obtained by superimposing image data captured by the imaging units 12101 to 12104.

At least one of the imaging units 12101 to 12104 may have a function of acquiring distance information. For example, at least one of the imaging units 12101 to 12104 may be a stereo camera including a plurality of image sensors or may be an image sensor having pixels for phase difference detection.

For example, the microcomputer 12051 obtains distances to three-dimensional objects in the imaging ranges 12111 to 12114 and temporal changes in the distances (relative speeds to the vehicle 12100) on the basis of distance information obtained from the imaging units 12101 to 12104, thereby to extract, as a leading vehicle, particularly a three-dimensional object closest to the vehicle 12100 on a traveling road and traveling at a predetermined speed (for example, 0 km/h or more) in substantially the same direction as the vehicle 12100. Furthermore, the microcomputer 12051 can set an inter-vehicle distance to be secured in advance before the leading vehicle, and can exercise automatic brake control (including follow-up stop control), automatic acceleration control (including follow-up start control), and the like. In this way, cooperative control can be exercised for the purpose of automatic driving or the like for autonomous travel without depending on an operation of a driver.

For example, the microcomputer 12051 can extract three-dimensional object data regarding three-dimensional objects by classifying the three-dimensional objects into two-wheeled vehicles, ordinary vehicles, large vehicles, pedestrians, and other three-dimensional objects such as electric poles, on the basis of the distance information obtained from the imaging units 12101 to 12104, and can use the three-dimensional object data for automatic avoidance of obstacles. For example, the microcomputer 12051 discriminates obstacles around the vehicle 12100 into an obstacle which can be visually recognized by a driver of the vehicle 12100 and an obstacle which is difficult to be visually recognized by the driver. Then, the microcomputer 12051 determines a collision risk indicating a risk of collision with each of the obstacles, and in a case where the collision risk is a set value or more and there is a collision possibility, can perform drive assist for collision avoidance by outputting warning to the driver through the audio speaker 12061 or the display unit 12062, and performing forced deceleration or avoidance steering through the drive system control unit 12010.

At least one of the imaging units 12101 to 12104 may be an infrared camera that detects infrared rays. For example, the microcomputer 12051 can recognize a pedestrian by determining whether or not a pedestrian is present in images captured by the imaging units 12101 to 12104. Such recognition of a pedestrian is performed, for example, by a procedure of extracting feature points in the captured images of the imaging units 12101 to 12104 as infrared cameras and a procedure of performing pattern matching processing on a series of feature points indicating a contour of an object to determine whether or not the object is a pedestrian. When the microcomputer 12051 determines that a pedestrian is present in the captured image of the imaging units 12101 to 12104 and recognizes the pedestrian, the audio/image output unit 12052 controls the display unit 12062 to superimpose and display a square contour line for emphasizing to the recognized pedestrian. In addition, the audio/image output unit 12052 may control the display unit 12062 to display an icon or the like indicating the pedestrian at a desired position.

In the present specification, the term "system" refers to an entire device including a plurality of devices.

Note that the effects described in the present specification are merely exemplified effects and are not limitative, and other effects may be achieved.

Note that embodiments of the present technology are not limited to the above-described embodiments, and various modifications can be made without departing from the gist of the present technology.

Note that the present technology can also include the following configurations.

(1)

An imaging apparatus including:

a lens that collects subject light;

an image sensor that photoelectrically converts the subject light from the lens;

a circuit substrate including a circuit that outputs a signal from the image sensor to the outside;

an actuator that drives the lens with a pulse width modulation (PWM) waveform; and a detection unit that detects a magnetic field generated by a coil included in the actuator.

(2)

The imaging apparatus according to (1), in which the detection unit detects an induced electromotive force generated by the magnetic field.

(3)

The imaging apparatus according to (2), in which the detection unit detects a position of the lens from the induced electromotive force.

(4)

The imaging apparatus according to any one of (1) to (3), in which the detection unit is formed on the circuit substrate.

(5)

The imaging apparatus according to any one of (1) to (3), further including a spacer for fixing the image sensor and the circuit substrate, in which the detection unit is formed in the spacer.

(6)

The imaging apparatus according to any one of (1) to (3), in which the imaging apparatus is housed in a housing, and the detection unit is formed on the housing.

(7)

The imaging apparatus according to (6), further including a fixing mechanism that fixes the imaging apparatus to the housing, in which the detection unit is formed on the fixing mechanism.

(8)

The imaging apparatus according to (1), in which the detection unit includes a coil, the circuit substrate includes a plurality of layers, and the coil is formed across the plurality of layers of the circuit substrate.

(9)
The imaging apparatus according to any one of (1) to (8), in which
the image sensor has a chip size package (CSP) shape.
(10)
The imaging apparatus according to any one of (1) to (8), in which
the image sensor has a chip size package (CSP) shape, and
an infrared cut filter and a lens at a lowermost layer of the lens are provided on a glass substrate of the image sensor in the CSP shape.
(11)
The imaging apparatus according to any one of (1) to (8), in which
the image sensor has a flip-chip structure.
(12)
The imaging apparatus according to any one of (1) to (8), in which
the image sensor has a flip-chip structure and is mounted on the circuit substrate, and
an infrared cut filter serving as a base material is adhered to the circuit substrate.
(13)
The imaging apparatus according to any one of (1) to (8), further including a storage unit that stores a correction value for correcting variation between imaging apparatuses.
(14)
An electronic apparatus including imaging apparatus including:
a lens that collects subject light;
an image sensor that photoelectrically converts the subject light from the lens;
a circuit substrate including a circuit that outputs a signal from the image sensor to the outside;
an actuator that drives the lens with a pulse width modulation (PWM) waveform; and
a detection unit that detects a magnetic field generated by a coil included in the actuator.

REFERENCE SIGNS LIST

1 Imaging apparatus
11 Image sensor
12 Metal wire
13 Circuit board
14 Spacer
15 Adhesive
16 Lens
17 Infrared cut filter
18 Actuator
19 Connector
20 Auto-focus driver
31 Detection circuit
32 Coil
51 Amplification unit
52 A/D conversion unit
53 AF control unit
54 Control unit
101 Housing
102 Camera window
110 Fixing mechanism

What is claimed is:
1. An imaging apparatus comprising:
a first lens that collects subject light;
an image sensor that photoelectrically converts the subject light from the first lens;
a circuit substrate including a circuit that outputs a signal from the image sensor to an outside, wherein the circuit substrate includes a plurality of layers;
an actuator that drives the first lens with a pulse width modulation (PWM) waveform; and
a detection unit that detects a magnetic field generated by a first coil included in the actuator, wherein the detection unit is formed on the circuit substrate, wherein the detection unit includes a second coil, and wherein the second coil is formed across the plurality of layers of the circuit substrate such that a start point of the second coil is on one layer of the plurality of layers and an end point of the second coil is on a different layer of the plurality of layers.

2. The imaging apparatus according to claim 1, wherein the detection unit detects an induced electromotive force generated by the magnetic field.

3. The imaging apparatus according to claim 2, wherein the detection unit detects a position of the first lens based on a magnitude of the induced electromotive force.

4. The imaging apparatus according to claim 1, wherein the image sensor has a chip size package (CSP) shape.

5. The imaging apparatus according to claim 1, wherein the image sensor has a chip size package (CSP) shape, and an infrared cut filter and a second lens are provided on a glass substrate of the image sensor in the CSP shape, wherein the second lens is below the first lens.

6. The imaging apparatus according to claim 1, wherein the image sensor has a flip-chip structure.

7. The imaging apparatus according to claim 1, wherein the image sensor has a flip-chip structure and is mounted on the circuit substrate, and
an infrared cut filter serving as a base material is adhered to the circuit substrate.

8. The imaging apparatus according to claim 1, further comprising:
a storage unit that stores a correction value for correcting variation between imaging apparatuses.

9. An electronic apparatus comprising imaging apparatus including:
a first lens that collects subject light;
an image sensor that photoelectrically converts the subject light from the first lens;
a circuit substrate including a circuit that outputs a signal from the image sensor to an outside, wherein the circuit substrate includes a plurality of layers;
an actuator that drives the first lens with a pulse width modulation (PWM) waveform; and
a detection unit that detects a magnetic field generated by a first coil included in the actuator, wherein the detection unit includes a second coil, and wherein the second coil is formed across the plurality of layers of the circuit substrate such that a start point of the second coil is on one layer of the plurality of layers and an endpoint of the second coil is on a different layer of the plurality of layers.

10. The electronic apparatus according to claim 9, wherein
the detection unit detects an induced electromotive force generated by the magnetic field.

11. The electronic apparatus according to claim 10, wherein
the detection unit detects a position of the first lens based on a magnitude of the induced electromotive force.

12. The electronic apparatus according to claim 9, wherein
the image sensor has a chip size package (CSP) shape.

13. The electronic apparatus according to claim 12, further comprising:
an infrared cut filter and a second lens are provided on a glass substrate of the image sensor in the CSP shape, wherein the second lens is below the first lens.

14. The electronic apparatus according to claim 9, wherein
the image sensor has a flip-chip structure.

15. The electronic apparatus according to claim 14, further comprising:
an infrared cut filter serving as a base material is adhered to the circuit substrate.

16. The electronic apparatus according to claim 9, further comprising:
a storage unit that stores a correction value for correcting variation between imaging apparatuses.

17. The imaging apparatus according to claim 1, wherein the second coil is perpendicular to the magnetic field generated by the first coil.

18. The electronic apparatus according to claim 9, wherein the second coil is perpendicular to the magnetic field generated by the first coil.

\* \* \* \* \*